United States Patent
Ota

(10) Patent No.: US 11,025,878 B2
(45) Date of Patent: Jun. 1, 2021

(54) IMAGE PROCESSING APPARATUS, IMAGE PROCESSING METHOD THEREOF AND STORAGE MEDIUM

(71) Applicant: CANON KABUSHIKI KAISHA, Tokyo (JP)

(72) Inventor: Yuya Ota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 16/025,405

(22) Filed: Jul. 2, 2018

(65) Prior Publication Data
US 2019/0014301 A1    Jan. 10, 2019

(30) Foreign Application Priority Data

Jul. 6, 2017  (JP) .............................. JP2017-133057

(51) Int. Cl.
  *H04N 13/111*    (2018.01)
  *G06K 9/32*      (2006.01)
  (Continued)

(52) U.S. Cl.
  CPC ......... *H04N 13/111* (2018.05); *G06K 9/3241* (2013.01); *G06K 9/4604* (2013.01);
  (Continued)

(58) Field of Classification Search
  CPC ....... G06T 15/205; G06T 15/04; G06T 15/08; G06T 15/10; G06T 17/00; G06T 2200/08;
  (Continued)

(56) References Cited

U.S. PATENT DOCUMENTS

| 5,745,126 A | * | 4/1998 | Jain | ...................... | H04N 13/246 |
| | | | | | 382/154 |
| 7,463,280 B2 | * | 12/2008 | Steuart, III | ............ | G03B 35/08 |
| | | | | | 348/36 |

(Continued)

FOREIGN PATENT DOCUMENTS

JP    2003271928 A    9/2003

OTHER PUBLICATIONS

Kitahara, et al., "Scalable 3D Representation for 3D Video Display in a Large-scale Space", Computer Socieity, Proceedings of the IEEE Virtual Reality 2003, 8 pages.

(Continued)

*Primary Examiner* — Ming Wu
(74) *Attorney, Agent, or Firm* — Carter, DeLuca & Farrell LLP

(57) ABSTRACT

An image processing apparatus, which executes image processing for generating a virtual viewpoint image using a plurality of images captured by a plurality of imaging units that image an imaging space from different viewpoints, identifies a specific object among a plurality of objects inside the imaging space, and carries out image processing for generating the virtual viewpoint image on the plurality of objects inside the imaging space. The image processing apparatus executes the image processing on the identified specific object using images captured by more imaging units than in the image processing executed on other objects.

13 Claims, 18 Drawing Sheets

(51) Int. Cl.
    *G06K 9/46*     (2006.01)
    *H04N 13/204*     (2018.01)
    *H04N 13/172*     (2018.01)
    *G06T 7/564*     (2017.01)
    *G06T 17/00*     (2006.01)
    *G06T 15/20*     (2011.01)
    *H04N 5/247*     (2006.01)

(52) U.S. Cl.
    CPC .............. *G06T 7/564* (2017.01); *G06T 15/20* (2013.01); *G06T 17/00* (2013.01); *H04N 5/247* (2013.01); *H04N 13/172* (2018.05); *H04N 13/204* (2018.05); *G06T 2210/36* (2013.01)

(58) Field of Classification Search
CPC . G06T 2207/10012; G06T 2207/10021; G06T 2207/30221; G06T 2207/30241; G06T 2210/56; G06T 5/005; G06T 7/20; G06T 7/292; G06T 7/593; G06T 7/85; H04N 13/117; H04N 13/194; H04N 13/243; H04N 13/246; H04N 13/257; H04N 13/139; H04N 13/156; H04N 13/167; H04N 13/189; H04N 13/239; H04N 13/279; H04N 13/289; H04N 13/296; H04N 13/334; H04N 13/337; H04N 13/341; H04N 13/344; H04N 13/363; H04N 19/597; H04N 2013/0081; H04N 2013/0085; H04N 2013/0092; H04N 2013/0096; H04N 5/222; H04N 5/2627; H04N 5/77; H04N 7/142; H04N 7/15; H04N 7/157
See application file for complete search history.

(56) References Cited

U.S. PATENT DOCUMENTS

| | | |
|---|---|---|
| 2009/0315978 A1 | 12/2009 | Wurmlin et al. |
| 2013/0321396 A1 | 12/2013 | Kirk et al. |
| 2014/0098185 A1* | 4/2014 | Davari ............... H04N 5/23238 348/36 |
| 2014/0146172 A1 | 5/2014 | Koichiro et al. |
| 2015/0098623 A1 | 4/2015 | Seiya et al. |
| 2016/0350599 A1* | 12/2016 | Bataller .................... G06T 7/13 |
| 2017/0064294 A1* | 3/2017 | Priede ................... G06T 19/006 |
| 2017/0078646 A1* | 3/2017 | Matsunobu ............ H04N 5/247 |
| 2017/0090586 A1* | 3/2017 | Raulot ................ G06F 3/04842 |

OTHER PUBLICATIONS

Furuya et a., "Viewpoint-dependent Quality Control on Microfacet Billboarding Model for Sports Video", ICME, 2007, pp. 1199-1202.
Extended European search report issued in corresponding European Application No. 18178437.2 dated Nov. 18, 2018, 12 pages.
EP Office Action issued in corresponding European Application No. 18178437.2, dated Oct. 29, 2020, pp. 1-8.

* cited by examiner

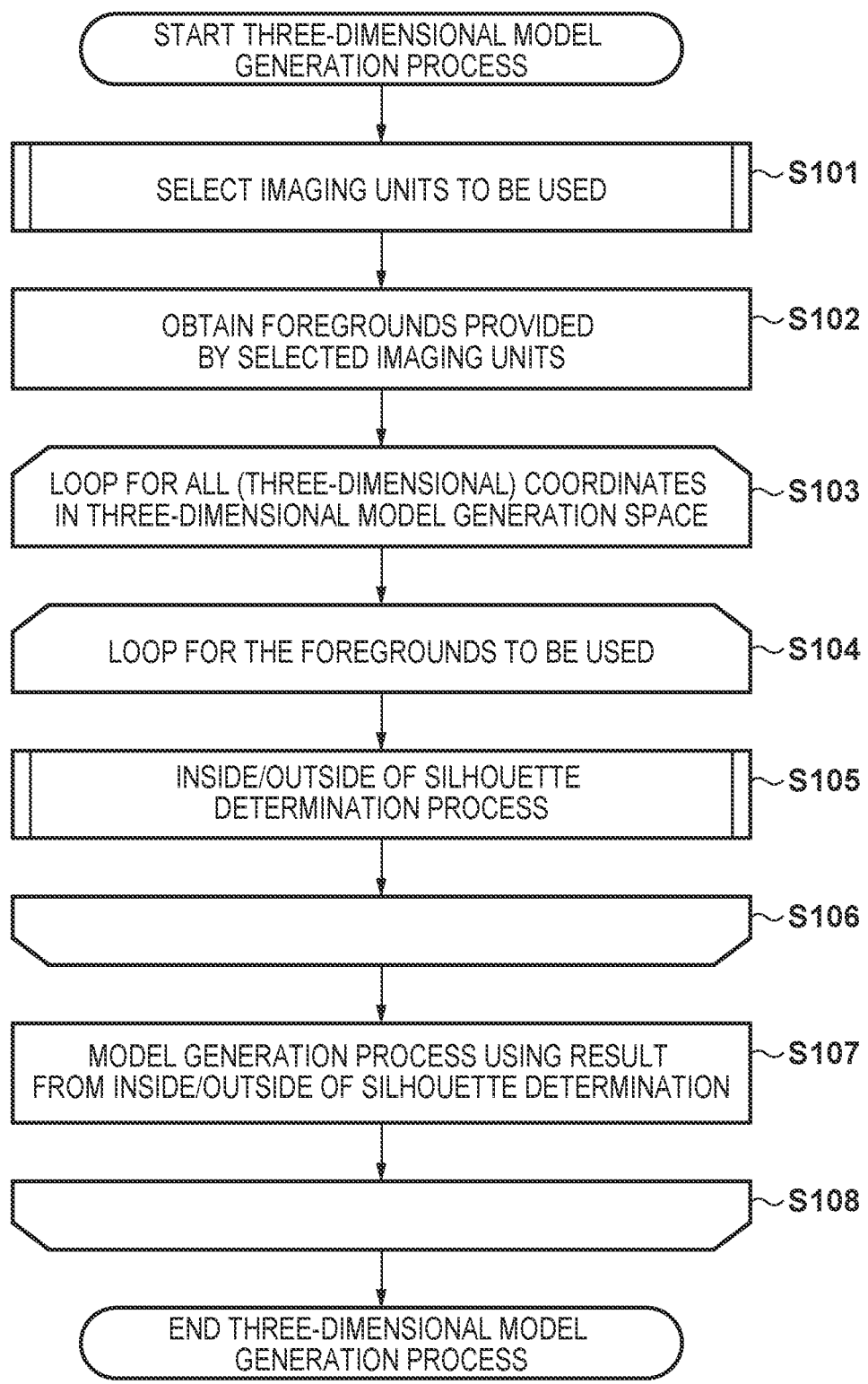

FIG. 7

| DATA | OBJECT ID | TARGET ID |
|---|---|---|
| OBJECT 301a | 1 | 1 |
| OBJECT 301b | 2 | 1 |
| OBJECT 301c | 3 | 1 |
| OBJECT 302a | 4 | 0 |
| OBJECT 302b | 5 | 0 |
| OBJECT 302c | 6 | 0 |
| OBJECT 302d | 7 | 0 |
| OBJECT 302e | 8 | 0 |
| OBJECT 302f | 9 | 0 |
| OBJECT 302g | 10 | 0 |

801

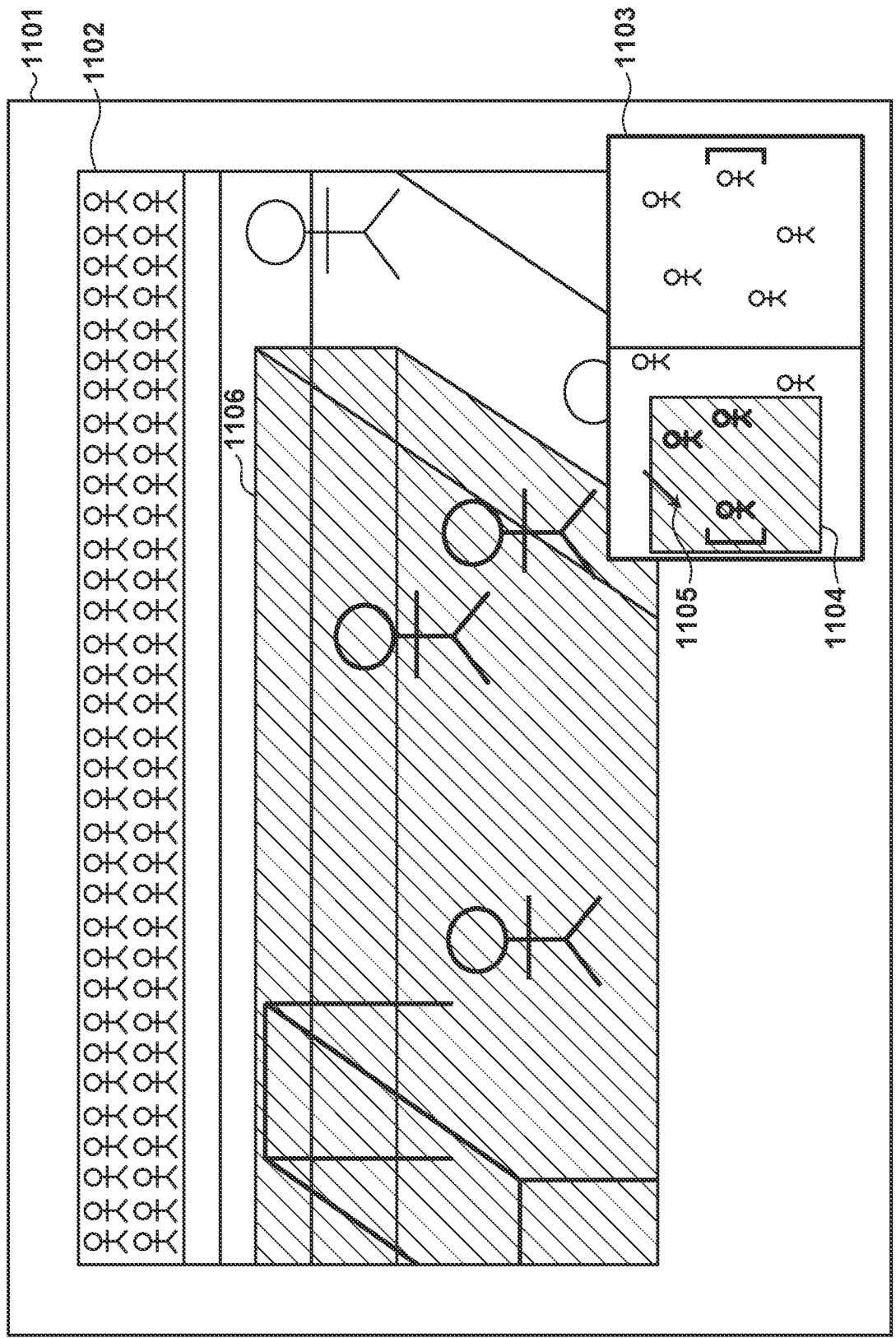

IMAGE PROCESSING APPARATUS, IMAGE PROCESSING METHOD THEREOF AND STORAGE MEDIUM

BACKGROUND OF THE INVENTION

Field of the Invention

The present invention relates to an image processing apparatus, an image processing method and a storage medium, particularly to a technique for processing images from a plurality of cameras.

Description of the Related Art

In three-dimensional modeling techniques, three-dimensional model data of an object having a three-dimensional shape is typically generated on the basis of a plurality of camera images obtained from a plurality of cameras laid out around an imaging space. One such three-dimensional modeling technique is a three-dimensional model generation technique called "volume intersection" or "Visual Hull" (both will simply be referred to as "Visual Hull" hereinafter). With Visual Hull, when a three-dimensional model is to be created for an object, a silhouette of the object in the image from each of the cameras is back-projected virtually in the object direction from the position of the optical principle point of the camera. As a result, a cone-like area having the optical principle point position as its apex and the silhouette of the object as its cross-section is formed. An area where the cone-like areas formed by the cameras overlap (a logical product) is then taken as a three-dimensional model of the object. Compared to a method of matching feature amounts calculated from the images obtained by the cameras and generating the three-dimensional model from the positional relationships among the feature amounts, Visual Hull is in principle less accurate with respect to convex surfaces, but the processing is faster.

Regardless of whether Visual Hull or feature amount matching is used, a higher number of cameras laid out in the periphery will both improve the accuracy of the three-dimensional model and increase the processing time. Japanese Patent Laid-Open No. 2003-271928 discloses a configuration that maintains accuracy while reducing the computation amount by first finding the general shape of a three-dimensional model through Visual Hull and then finding details through feature amount matching. This is done with the aim of generating the three-dimensional model quickly.

However, according to the method disclosed in Japanese Patent Laid-Open No. 2003-271928, if a plurality of objects exist, the accuracy of the three-dimensional models will change equally across the plurality of objects. As such, the method disclosed in Japanese Patent Laid-Open No. 2003-271928 cannot respond to demand for reducing the overall computation amount while maintaining the accuracy of a target object.

SUMMARY OF THE INVENTION

According to one aspect of the present invention, there is provided an image processing apparatus that executes image processing for generating a virtual viewpoint image using a plurality of images captured by a plurality of imaging units that image an imaging space from different viewpoints, the apparatus comprising: an identification unit configured to identify a specific object among a plurality of objects inside the imaging space; and a processing unit configured to carry out image processing for generating the virtual viewpoint image on the plurality of objects inside the imaging space, wherein the processing unit executes the image processing on the specific object identified by the identification unit using images captured by more imaging units than in the image processing executed on other objects.

According to another aspect of the present invention, there is provided an image processing method that executes image processing for generating a virtual viewpoint image using a plurality of images captured by a plurality of imaging units that image an imaging space from different viewpoints, the method comprising: identifying a specific object from a plurality of objects inside the imaging space; and carrying out image processing for generating the virtual viewpoint image on the plurality of objects inside the imaging space, wherein the image processing on the identified specific object is carried out using images captured by more imaging units than in the image processing executed on other objects.

According to another aspect of the present invention, there is provided a non-transitory computer-readable storage medium storing a program for causing a computer to execute an image processing method that executes image processing for generating a virtual viewpoint image using a plurality of images captured by a plurality of imaging units that image an imaging space from different viewpoints, the method comprising: identifying a specific object from a plurality of objects inside the imaging space; and carrying out image processing for generating the virtual viewpoint image on the plurality of objects inside the imaging space, wherein the image processing on the identified specific object is carried out using images captured by more imaging units than in the image processing executed on other objects.

Further features of the present invention will become apparent from the following description of exemplary embodiments (with reference to the attached drawings).

BRIEF DESCRIPTION OF THE DRAWINGS

FIG. 2 is a flowchart illustrating a three-dimensional model generation process.

FIG. 7 is a diagram illustrating a table that holds relationships between target objects and object IDs.

FIG. 10 is a diagram illustrating an area designation operation screen.

DESCRIPTION OF THE EMBODIMENTS

First Embodiment

Figure 1:
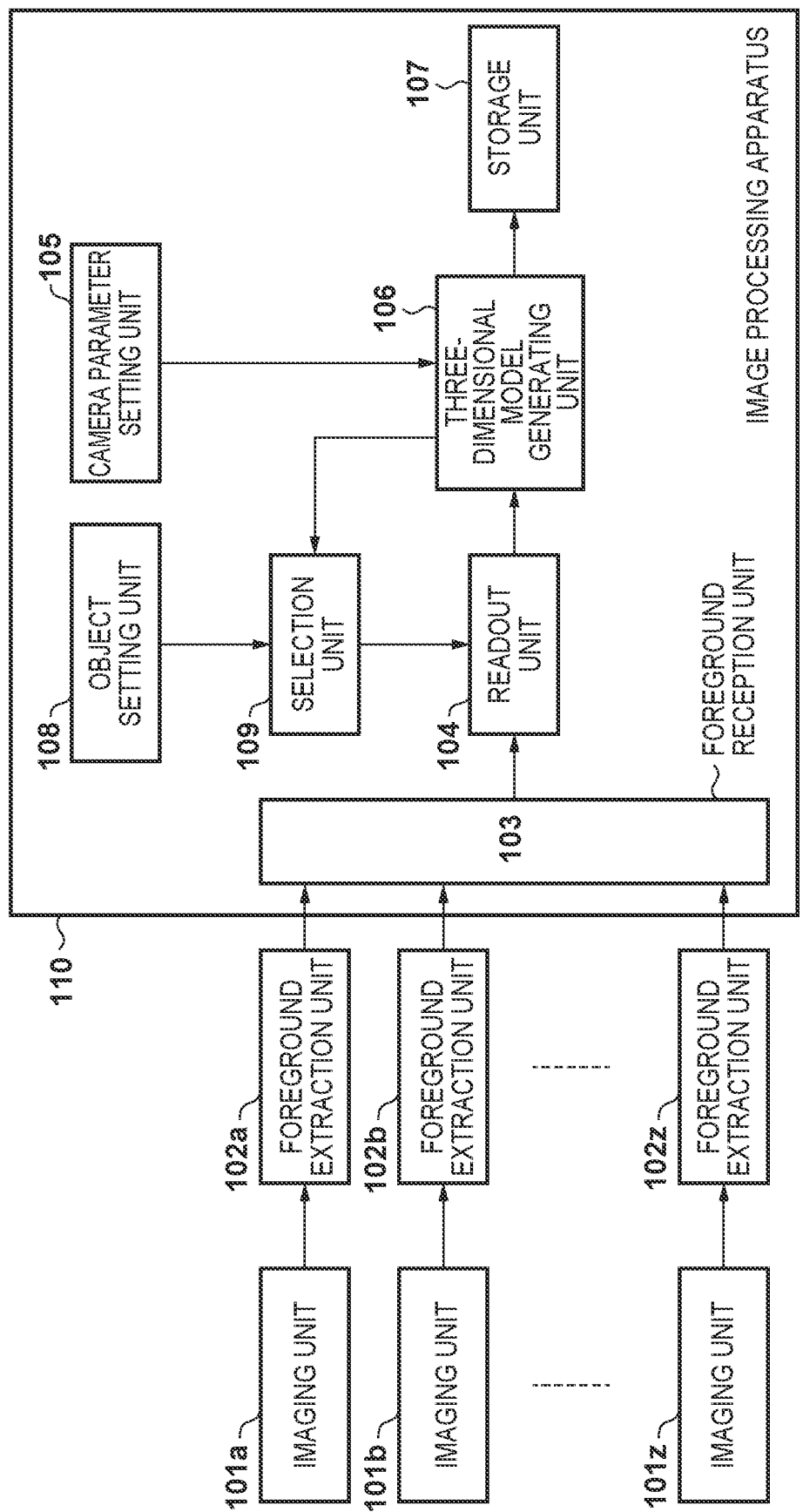
FIG. 1 is a block diagram illustrating an example of the functional configuration of an image processing apparatus.

The configuration of an image processing system according to a first embodiment will be described with reference to FIG. 1. The image processing system includes a plurality of imaging units 101a-z, a plurality of foreground extraction units 102a-z, and an image processing apparatus 110. A computer device such as a personal computer (PC), a workstation (WS), various types of servers, or the like can be used as the image processing apparatus 110, but this embodiment makes no particular limitation on the type of the device.

Figure 18:
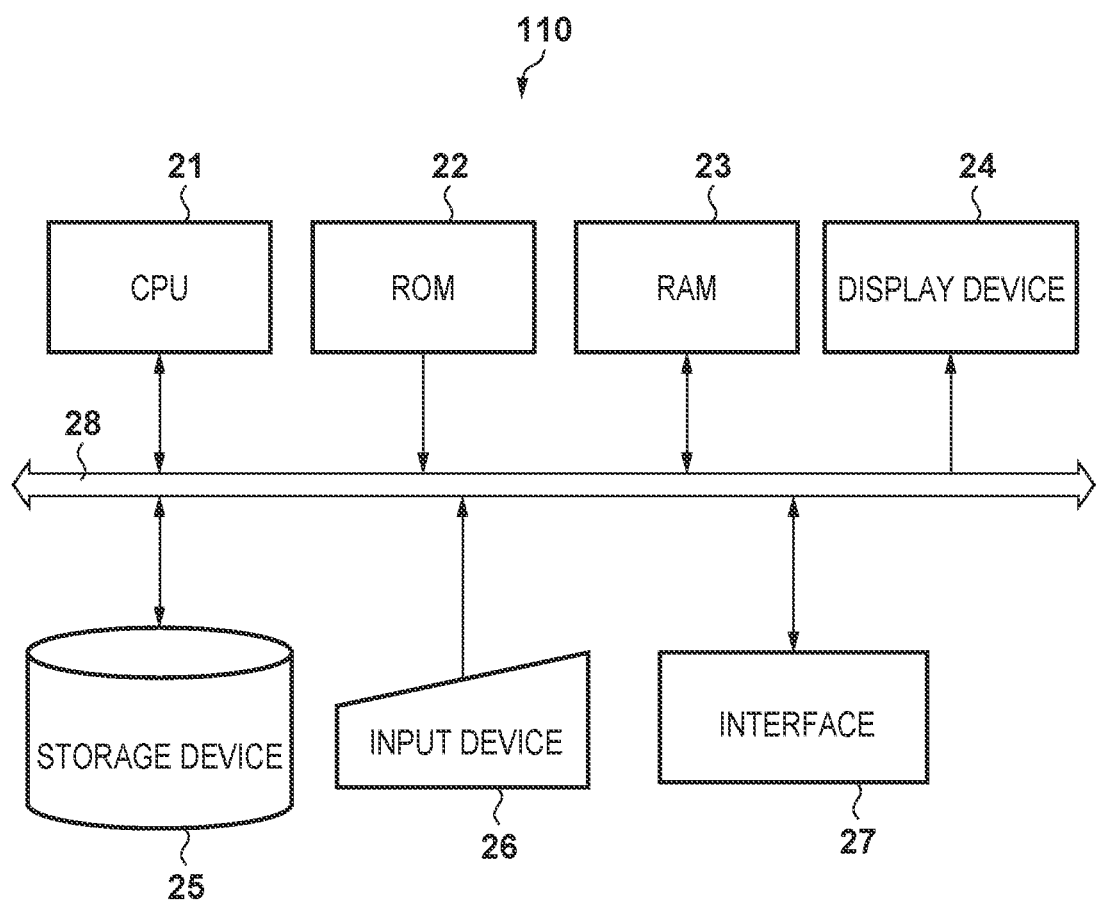
FIG. 18 is a block diagram illustrating an example of the hardware configuration of an image processing apparatus.

FIG. 18 is a block diagram illustrating an example of the hardware configuration of the image processing apparatus 110 according to this embodiment. A CPU 21 is a central processing unit, which controls the information processing apparatus as a whole by executing programs stored in ROM 22 or RAM 23. The CPU 21 realizes the functional units of the image processing apparatus 110 illustrated in FIG. 1, for example, by loading predetermined programs stored in a storage device 25 into the RAM 23 and executing the programs loaded into the RAM 23. The ROM 22 is read-only non-volatile memory. The RAM 23 is randomly-accessible memory. Dynamic Random Access Memory (DRAM) can be used as the RAM 23. A display device 24 makes various displays under the control of the CPU 21.

The storage device 25 is a high-capacity storage device constituted by a hard disk, for example. Images obtained from the plurality of imaging units, foreground images, and the like can be stored in the storage device 25. An input device 26 accepts various user inputs to the image processing apparatus 110. An interface 27 is an interface for connecting the image processing apparatus 110 to an external device, and in this embodiment, the plurality of foreground extraction units 102 are connected. Note that the foreground extraction units 102 and the image processing apparatus 110 may be connected over a network such as a LAN. In this case, the interface 27 functions as a network interface. A bus 28 communicatively connects the above-described elements to each other.

Although the functional units of the image processing apparatus 110 are described as being realized by the CPU 21 executing predetermined programs, the units are not limited thereto. For example, hardware such as a Graphics Processing Unit (GPU) or a Field Programmable Gate Array (FPGA) for accelerating the computation may be used as well. In other words, the functional units of the image processing apparatus 110 may be realized by software and hardware such as dedicated ICs operating in tandem, and some or all of the functions may be realized by hardware alone. Furthermore, a configuration in which the processes of the functional units are executed in a decentralized manner by employing a plurality of image processing apparatuses 110 may be used as well.

Returning to FIG. 1, the units constituting the image processing system according to this embodiment will be described. The imaging units 101a-z are devices that capture digital images, and typical digital cameras or digital video cameras can be used as the imaging units 101a-z. The imaging units 101a-z are laid out so as to image an imaging space from different viewpoints, and capture moving images at set framerates as the digital images. The imaging units 101a-z capture images at the same framerate and the same timing, i.e., in synchronization. Note that the imaging ranges of the plurality of imaging units 101a-z may partially overlap.

The foreground extraction units 102a-z receive the images captured by the imaging units 101a-z and extract a foreground from the corresponding overall image. Here, "foreground" refers to an image area recognized as an object, such as a person or a ball. A user or the like can specify what types of objects are to be extracted as the foreground in advance. A method that uses background difference information can be given as an example of a method for extracting the foreground. According to this method, for example, a state in which no foreground exists is captured in advance as a background image, and an area in which the value of a difference between the captured image and the background image is greater than a threshold is determined to be the foreground. However, the method for extracting the foreground is not limited to this method. A variety of methods, such as methods using feature amounts or machine learning, can be used, and any method for extracting the foreground may be used in this embodiment.

It is assumed that when extracting the foreground, each of the foreground extraction units 102 generates a binary silhouette image in which pixels extracted as the foreground have a value of "1" and pixels that are not the foreground have a value of "0". The silhouette images are used by a three-dimensional model generating unit 106. The following assumes that "silhouette image" is also included when referring to the foreground.

The image processing apparatus 110 processes the plurality of images captured by the plurality of imaging units 101 imaging mutually-different visual field ranges (in this embodiment, the image processing apparatus 110 processes the foregrounds extracted from the stated images). In the image processing apparatus 110, a foreground reception unit 103 receives the extracted foregrounds from the foreground extraction units 102a-z, and the designated foregrounds are output from a readout unit 104. In this embodiment, the foreground reception unit 103 is connected to the foreground extraction units 102a-z over a network. Ethernet (registered trademark), for example, is used for the network connection, but the network is not limited thereto. The foreground reception unit 103 aggregates and stores the data from the imaging units 101 and the foreground extraction units 102 (the foregrounds) over the network. The connections between the foreground reception unit 103 and the foreground extraction units 102 are not limited to network connections. For example, the connections may employ Serial Digital Interface (SDI), Digital Visual Interface (DVI), or the like, which are image transfer interfaces.

The readout unit 104 reads out a foreground, designated by a selection unit 109, from the foreground reception unit 103 and provides that foreground to the three-dimensional model generating unit 106. Although it is conceivable to use the foregrounds from all of the imaging units 101 in the generation of the three-dimensional model, a foreground to be used in the generation of the three-dimensional model is selected by the selection unit 109 in this embodiment. The selection unit 109 will be described in detail later.

A camera parameter setting unit 105 sets information of the imaging units 101a-z as camera parameters, and passes those parameters to the three-dimensional model generating unit 106. Here, the camera parameters include a three-dimensional position in a world coordinate system, an attitude (orientation) of the camera, a focal length, and a principle point (the center of the camera image) of each imaging unit 101. The camera parameters are assumed to be measured and calculated by capturing a calibration pattern for calibrating the camera position in advance, and then carrying out coordinate conversion between three-dimensional coordinates defined on the basis of the calibration pattern and two-dimensional camera coordinates. The selection unit 109 selects an imaging unit, of the plurality of imaging units 101, that is to provide the image (foreground) used in the image processing (the generation of the three-dimensional model), on the basis of whether or not the processing target is a specific object. The specific object will be called a "target object" hereinafter. The readout unit 104 reads out, from the foreground reception unit 103, the image (foreground) provided from the imaging unit 101 selected by the selection unit 109, and provides that image to the three-dimensional model generating unit 106. Although this embodiment describes primarily an example in which the selection unit 109 selects the imaging unit, an image may be selected instead of selecting an imaging unit.

The three-dimensional model generating unit 106 generates a three-dimensional model using the camera parameters provided by the camera parameter setting unit 105 and the foreground provided by the readout unit 104. In this embodiment, Visual Hull is used as the method for generating the three-dimensional model. With Visual Hull, the three-dimensional model is found from the shared parts of cones seen from the cameras, and the computation algorithms can be broadly divided into the volume intersection method (VIM) and the space carving method (SCM). This embodiment uses SCM. In SCM, individual regular polygons in a three-dimensional space are back-projected onto planes of the individual imaging units 101. Polygons back-projected within the foregrounds of all of the imaging units 101 are left as foregrounds, while other polygons are deleted. The individual polygons in the three-dimensional space are typically called "voxels", and in Visual Hull, the foregrounds are called "silhouettes". For the sake of simplicity, a case where there is only one object, such as a person, serving as the foreground will be described first. A case where a plurality of objects exist will be described later separately.

Visual Hull processing according to this embodiment will be described with reference to the flowchart in FIG. 2. First, in accordance with information from an object setting unit 108, the selection unit 109 selects the imaging unit providing the foreground used to generate the three-dimensional model of a single foreground object (S101). The processing by the object setting unit 108 and the selection unit 109 will be described in detail later. Next, the readout unit 104 reads out the provided foreground from the imaging unit 101 (the foreground extraction unit 102) selected by the selection unit 109 (S102).

Figure 3A:
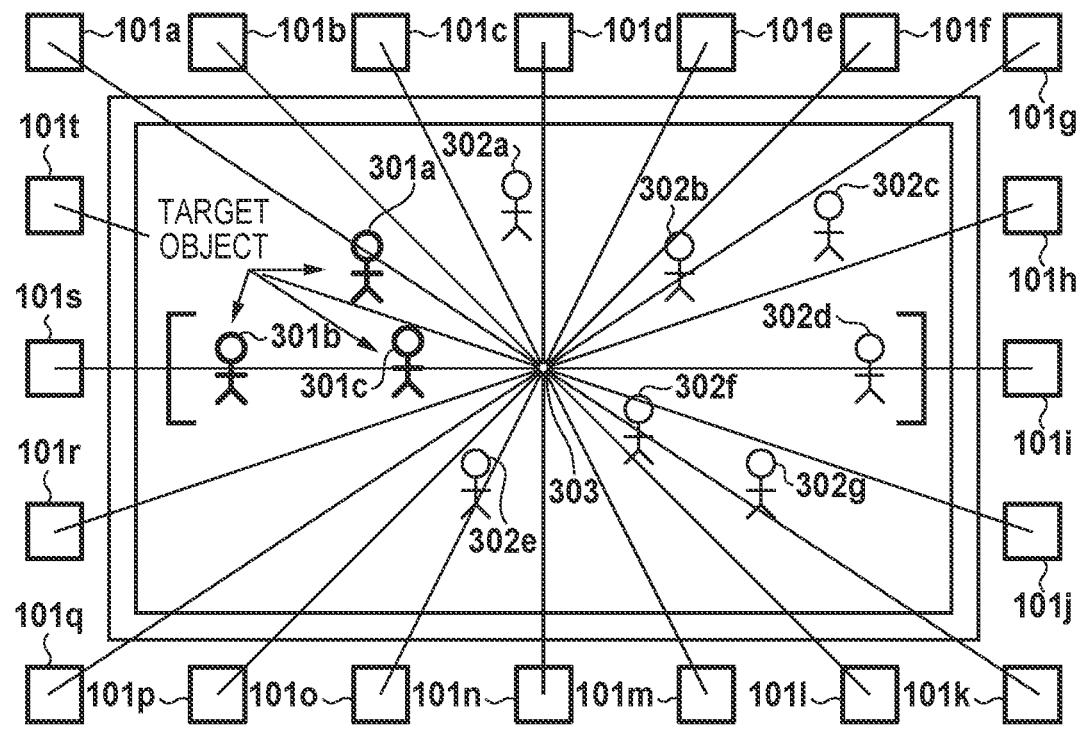
FIG. 3A is a diagram illustrating an example of the relationships between target objects and imaging units being used.
Figure 3B:
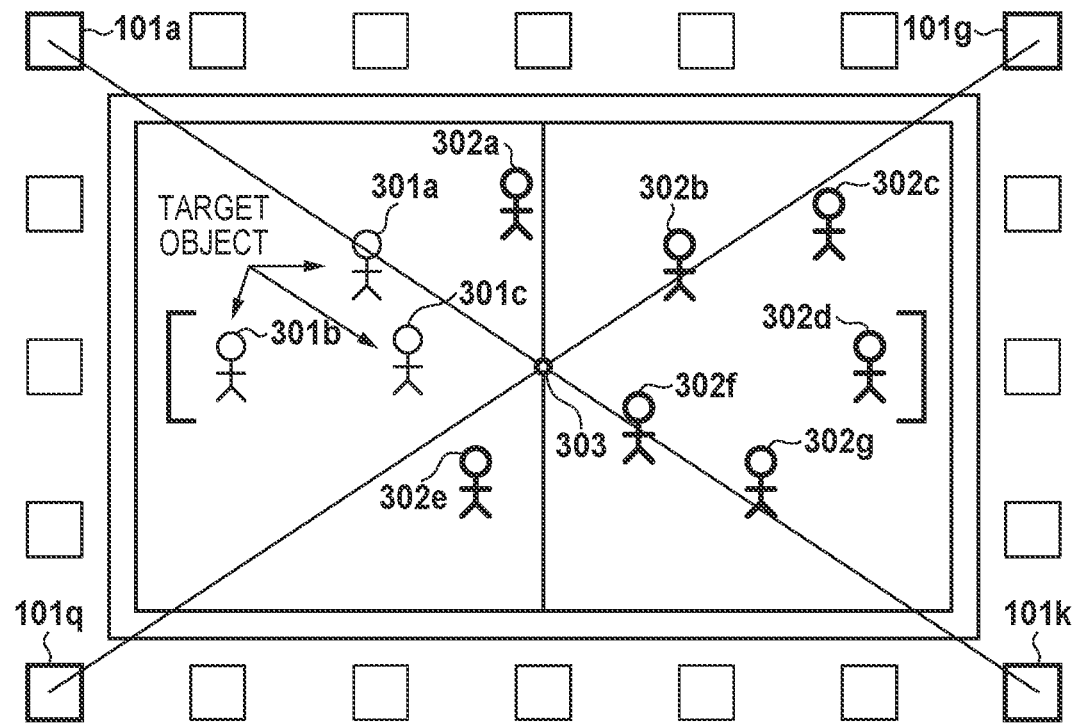
FIG. 3B is a conceptual diagram illustrating an example of relationships between non-target objects and imaging units being used.

The selection of the imaging unit 101 providing the foreground image to be used will be described here with reference to the conceptual diagrams in FIGS. 3A and 3B. FIGS. 3A and 3B are bird's-eye views of the layout of the imaging units 101 and the positions of the foreground objects ("objects 301a-c and 302a-g" hereinafter). The lines from the imaging units 101 represent the orientations (imaging directions) of the imaging units 101, and the imaging units 101 are oriented toward a field center 303. Note that the number, positions, and so on of the objects are not limited to those illustrated here.

The object setting unit 108 sets target objects, from among these foreground objects, in response to a user operation, for example. The following descriptions will assume that the objects 301a-c have been set as the target objects. If the foreground object for which a three-dimensional model is to be generated is a target object (the object 301a, 301b, or 301c), the foregrounds obtained from the images from all of the imaging units 101 are used in the three-dimensional model generation process. FIG. 3A illustrates a case where the foreground objects for which three-dimensional models are to be generated are target objects. In FIG. 3A, imaging units 101a-t are laid out surrounding a field (an imaging space), and the foregrounds obtained from the images captured by the imaging units 101a-t are used to generate the three-dimensional models of the target objects inside the imaging space. In other words, the selection unit 109 selects all of the imaging units 101a-t for generating the three-dimensional models of the target objects.

FIG. 3B, meanwhile, illustrates a case where the foreground object to be used to generate the three-dimensional model is not a target objects, i.e., is a non-target object (one of objects 302a-g). In the example illustrated in FIG. 3B, the foregrounds obtained from images captured by four imaging units 101a, g, k, and q are used to generate the three-dimensional models of the non-target objects. In other words, the selection unit 109 selects the imaging units 101a, g, k, and q for generating the three-dimensional models of the non-target objects inside the imaging space. However, the number and layout of the imaging units used to generate the three-dimensional models of the target objects and the non-target objects are not limited to those described here. That being said, the number of imaging units selected by the selection unit 109 when the processing target is not set to a target object is lower than the number of imaging units selected by the selection unit 109 when the processing target is set to a target object. In this manner, the selection unit 109 selects the imaging units (foregrounds) used to generate the three-dimensional models in accordance with whether the object to be processed is a target object or a non-target object.

Next, image processing is executed on the object to be processed using the images (foregrounds), of the plurality of images (foregrounds) stored in the foreground reception unit 103, that have been provided by the imaging units selected by the selection unit 109. In this embodiment, the three-dimensional model generating unit 106 carries out image processing that generates a three-dimensional model for all coordinates (world coordinates) of a three-dimensional model generation space, using the foregrounds obtained from the images from the imaging units selected by the selection unit 109 (S103-S108). Note that the three-dimensional model generating unit 106 uses the CPU 21 of the image processing apparatus 110 as a computing device and the RAM 23 as a computing work space.

In this example, assuming that the coordinates in the three-dimensional model generation space are expressed in three dimensions as x, y, and z, a looped process is executed for all of the x, y, and z coordinates within a space of a predetermined size (S103, S108). In each loop, an inside/outside of silhouette determination process is carried out for coordinates that are to be processed out of all the coordinates (S105). This inside/outside of silhouette determination process is executed on the foregrounds read out by the readout unit 104 in accordance with the results of the selections made by the selection unit 109 (S104, S106). Accordingly, the loop from S104 to S106 is repeated the same number of times as there are imaging units selected by the selection unit 109.

Figure 4:
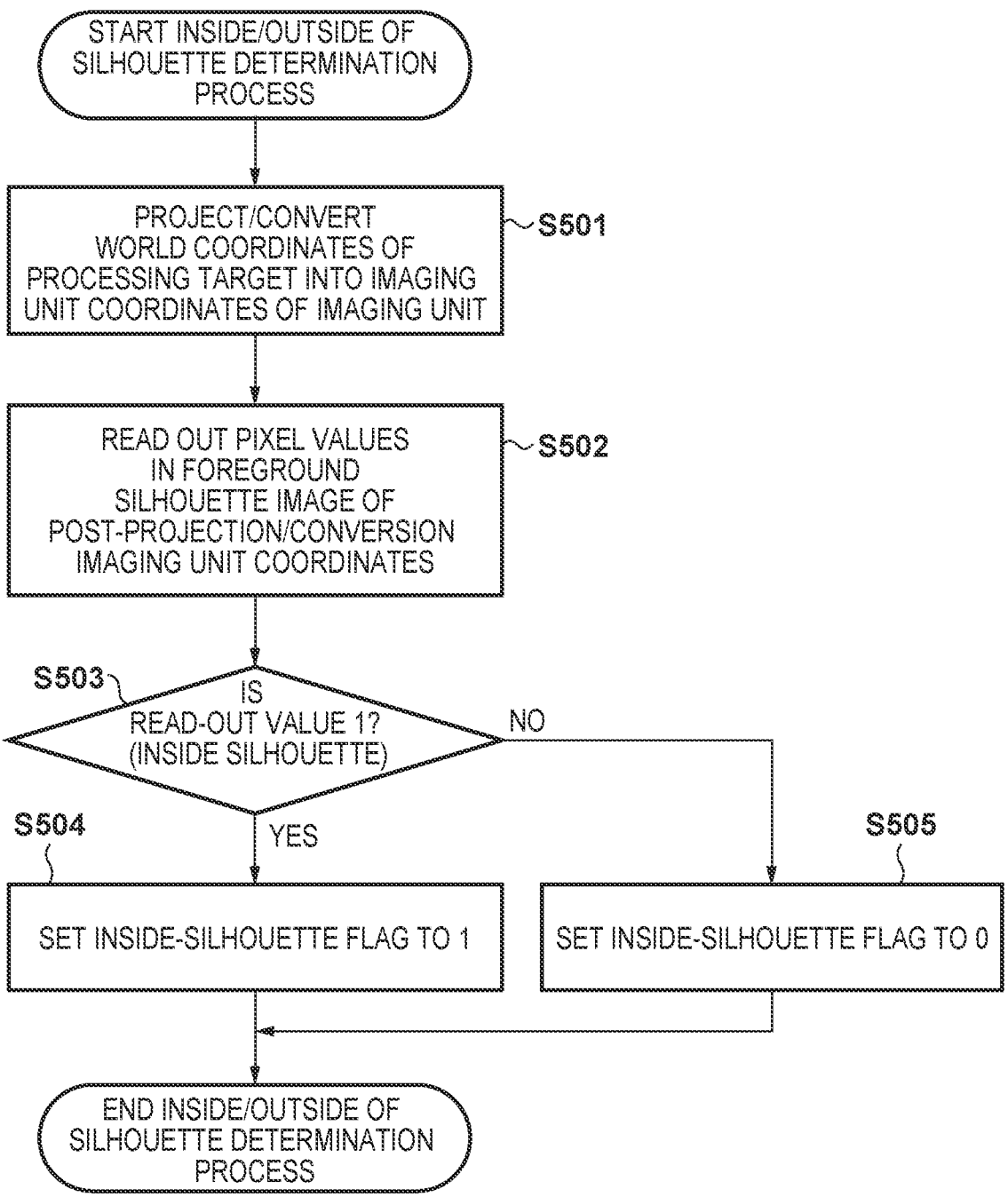
FIG. 4 is a flowchart illustrating an inside/outside of silhouette determination process.

The inside/outside of silhouette determination process executed in S105 will be described next with reference to the flowchart in FIG. 4. First, the three-dimensional model generating unit 106 projects and converts the world coordinates to be processed into imaging unit coordinates of the imaging units 101 (S501). With the world coordinates, an origin serving as a reference is set in the three-dimensional space to be processed, and positions from the origin are handled as corresponding coordinates in the three-dimensional space. This embodiment assumes that the coordinates in the three-dimensional space to be processed are converted into world coordinates in advance. On the other hand, "imaging unit coordinates" refers to coordinates in the images captured by the imaging units 101. Matrix values for the projection/conversion of the world coordinates into the imaging unit coordinates are determined from the camera parameters.

Next, the three-dimensional model generating unit 106 reads out the value of the foreground (silhouette image) at the imaging unit coordinate position found through the projection and conversion (S502). The three-dimensional model generating unit 106 determines whether or not the value read out in S502 is 1 (S503). If the read-out value is 1 (YES in S503), the three-dimensional model generating unit 106 determines that that imaging unit coordinate is inside the silhouette, and sets an inside-silhouette flag, which is present for all the coordinates in three dimensions, to 1 (S504). On the other hand, if the value read out from the silhouette image of the foreground data is 0 (NO in S503), the three-dimensional model generating unit 106 determines that that imaging unit coordinate is outside the silhouette, and sets the inside-silhouette flag to 0 (S505).

There are cases where the imaging unit coordinates after the projection and conversion exceed the coordinate range in the captured image. In this embodiment, such imaging unit coordinates are treated as "outside" of the silhouette. The configuration is not limited thereto, however, and a different determination logic may be employed instead. Treating coordinates as "other" (undeterminable) because the coordinates are in a range that cannot be seen and determination is therefore impossible, setting the coordinates to "inside" the silhouette in accordance with the determination logic of later stages, and so on are also conceivable, for example. Thus various algorithms are conceivable for cases where the imaging unit coordinates exceed the coordinate range in the image.

The process exits the loop of S104 to S106 once the inside/outside of silhouette determination process is complete for all of the foregrounds to be used. Then, the three-dimensional model generating unit 106 carries out a model generation process using the results of the inside/outside of silhouette determination (S107). Specifically, the three-dimensional model generating unit 106 makes a comprehensive determination for the inside-silhouette flags, which are the results of the inside/outside silhouette determination, for the number of imaging units selected by the selection unit 109, and decides whether to "leave" or "delete" the coordinates.

In this embodiment, a determination of "leave" is made if the inside-silhouette flag is 1 for all of the foregrounds being processed. A determination to "delete" the coordinates is made if even one of the inside-silhouette flags is 0 for the foregrounds being processed. This determination algorithm is merely an example, and a variety of algorithms can be employed. For example, the algorithm for determining whether to "leave" or "delete" is also related to how to handle projection results outside of the imaging unit coordinates when setting the inside-silhouette flag as described earlier. A determination of "leave" may be made if the number of inside-silhouette flags, among the inside-silhouette flags obtained for the foregrounds being processed, that are 1 is greater than or equal to a given threshold.

At the point where the process of S107 has ended, the process of leaving the shared areas of cones seen from the imaging units is complete for coordinates in the three-dimensional space being processed, and thus whether or not those coordinates being processed are to be part of the three-dimensional model is finalized. As such, once the above-described processing (S104 to S107) has been carried out for all of the x, y, and z in the three-dimensional space, the model of the target foreground object is generated on the basis of the coordinates determined to be "left". The generated model is outputted in point group format, which is a collection of voxels in the three-dimensional space.

The three-dimensional model generating unit 106 stores the outputted three-dimensional model in a storage unit 107. The storage unit 107 is, for example, a hard disk drive (HDD) built into the image processing apparatus 110. Alternatively, for example, a solid-state drive (SSD) built into the image processing apparatus 110, or a combination of an HDD and a SSD, may be used as the storage unit 107. If a plurality of foreground objects are to be processed, the above-described three-dimensional model generation process is executed for each object.

As described above, a number of loops (S104 to S106) corresponding to the number of imaging units used exists for all of the coordinates in the three-dimensional space, and thus reducing the number of imaging units used contributes greatly to a reduction in the computation amount. However, there is a tradeoff between the number of imaging units used and the accuracy of the generated three-dimensional model. Thus while uniformly reducing the number of imaging units used will reduce the computation amount, the accuracy of the model will drop uniformly as well, and thus a desirable accuracy cannot be maintained. Thus in this embodiment, the object setting unit 108 and the selection unit 109 are provided, and by determining the foregrounds to be used on a foreground object-by-foreground object basis, the overall computation amount can be reduced while maintaining the accuracy of the three-dimensional model of the target object.

Figure 5:
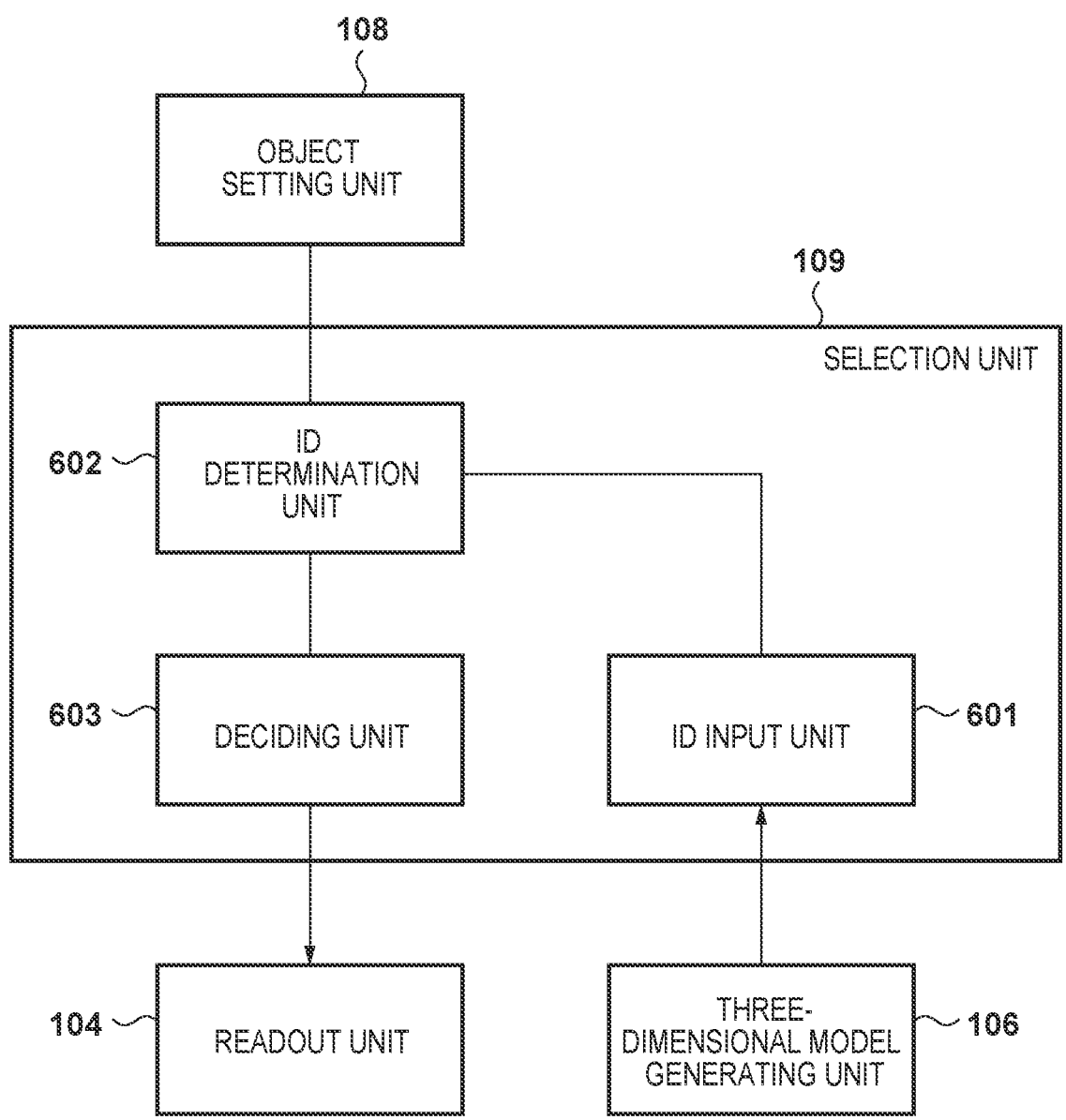
FIG. 5 is a block diagram illustrating an example of the functional configuration of a selection unit.
Figure 6:
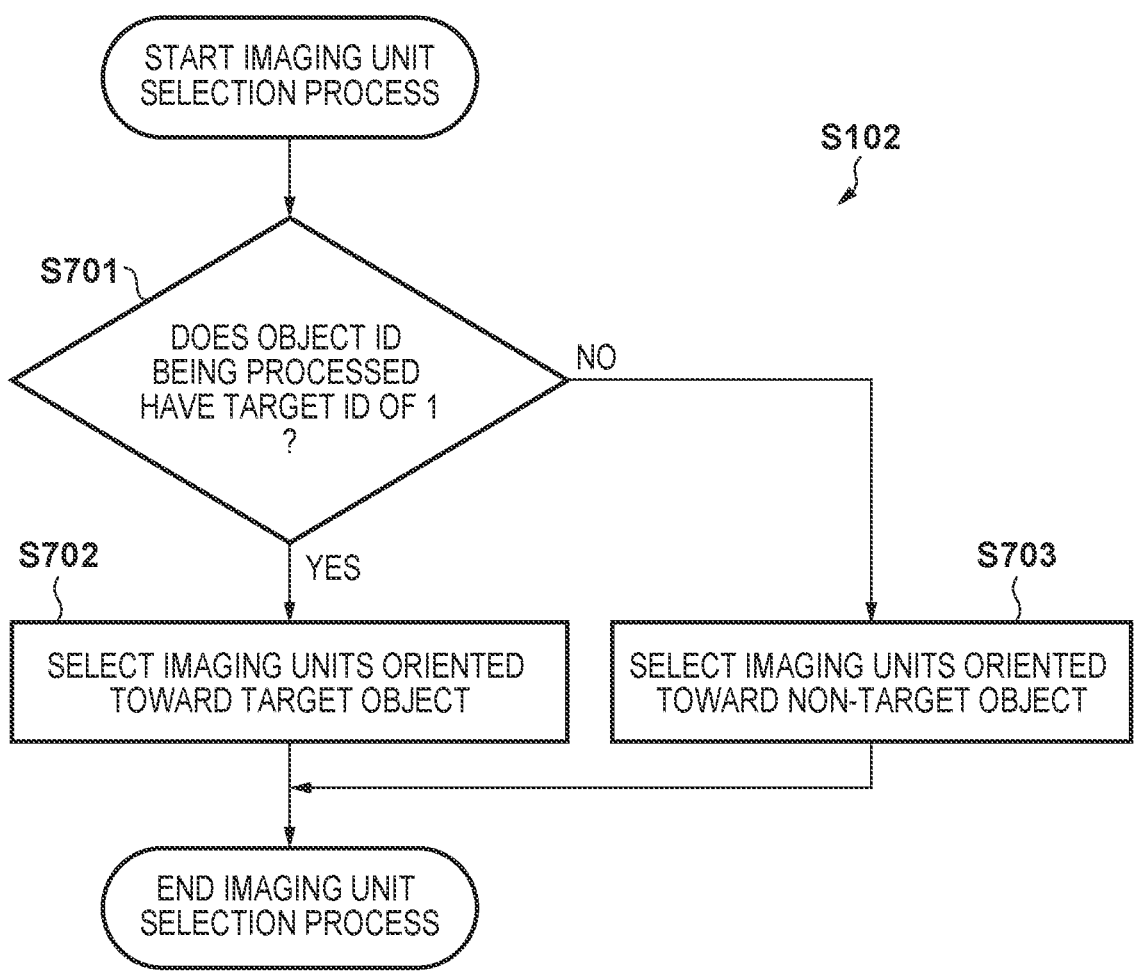
FIG. 6 is a flowchart illustrating a selection process of an imaging unit.

Details of the configuration and processing will be described next with reference to the function block diagram in FIG. 5 and the flowchart in FIG. 6, with particular focus on the object setting unit 108 and the selection unit 109.

The object setting unit 108 sets the target objects. The following will describe a case where a user has selected the objects 301a-c as target objects from a bird's-eye view screen such as that illustrated in FIG. 3A. At this time, the object setting unit 108 adds an object ID, which is identification information, to the objects 301a-c and 302a-g present in the imaging space, as indicated by a table 801 illustrated in FIG. 7, and manages those objects. The object setting unit 108 sets a target ID to 1 for the objects set as target objects. In the example illustrated in FIG. 7, the objects 301a-c, which have object IDs of 1-3 respectively, are set as target objects in the table 801. The user can specify a target object by, for example, touching an area of the bird's-eye view screen where a desired object is displayed. Alternatively, the target object may be specified by specifying an object ID managed in the table 801. In this case, the object IDs are displayed in the bird's-eye view screen, over the image and near the objects, so that the user can recognize the object IDs assigned to the objects in the display.

The processing by the selection unit 109 will be described in detail next with reference to FIGS. 5 and 6. An ID input unit 601 takes the object ID of the current processing target from the three-dimensional model generating unit 106 and sends that object ID to an ID determination unit 602. The ID determination unit 602 refers to the table 801 generated by the object setting unit 108, and determines whether or not the object being processed is a target object on the basis of the target ID of the object ID received from the ID input unit 601. A deciding unit 603 decides on the imaging units to be used on the basis of the determination result from the ID determination unit 602, and sends a readout instruction to the readout unit 104.

The processing by the ID determination unit 602 and the deciding unit 603 will be described further with reference to the flowchart in FIG. 6. First, the ID determination unit 602 determines whether the target ID of the object ID being processed is 1 by referring to the table 801 (S701). If it is determined that the target ID is 1 (YES in S701), the deciding unit 603 decides to select the imaging units oriented toward the target object as the imaging units providing the foregrounds that will be used (S702). In this embodiment, the imaging units 101a-t are all selected, as illustrated in FIG. 3A. However, if it is determined that the target ID is not 1 (NO in S701), the deciding unit 603 decides to select the imaging units oriented toward the non-target object as the imaging units providing the foregrounds that will be used (S703). In this embodiment, the imaging units 101a, g, k, and q are selected, as illustrated in FIG. 3B.

As a result of the above-described processing, all of the foregrounds provided by the imaging units 101a-t are read out in the generation of the three-dimensional models of the objects 301a, 301b, and 301c, which have been determined to be target objects. The foregrounds provided by the imaging units 101a, 101g, 101k, and 101q are read out in the generation of the three-dimensional models of the objects 302a-g, which have not been determined to be target objects. The read-out foregrounds are inputted to the three-dimensional model generating unit 106, and are used to generate the three-dimensional models of the respective objects.

If a plurality of objects to be processed are present, it is necessary to carry out a process for recognizing those objects before assigning object IDs to those objects as indicated in the table 801 (FIG. 7). Some sort of means for searching the three-dimensional space is required in order to detect/recognize the objects present in the three-dimensional space. The Visual Hull process can be used, for example. One method carries out the processing on the entire three-dimensional space, for polygons having a size large enough to include objects assumed to have the size of the voxels used in the processing. The remaining voxels are treated as independent objects. Alternatively, means that carry out the search using some sort of feature amount detection or machine learning are also conceivable, but the method for searching is not limited here. The above-described three-dimensional model generation process is carried out on each of the objects found.

As described thus far, according to the first embodiment, a higher number of foregrounds is used when generating a three-dimensional model of a target object than when generating a three-dimensional model of a non-target object. As a result, the overall computation amount can be reduced while maintaining the accuracy of the three-dimensional model of the target object.

Although the foregoing embodiment describes SCM as being used as the Visual Hull processing algorithm in the process of generating a three-dimensional model, the embodiment can also be applied when using VIM. Although VIM also references the foregrounds from all of the imaging units 101, the above-described selection unit 109 may be employed to ensure a limited number of foregrounds are used for the non-target objects. Accordingly, the overall computation amount can be reduced even when processing with the VIM technique.

Additionally, although the first embodiment describes using the foregrounds from all of the imaging units for the target object, it is not absolutely necessary to use all of the foregrounds. An appropriate amount (number of imaging units) may be set so as to balance the overall computation amount with the required three-dimensional model accuracy for the particular system being implemented. The same applies to the number of imaging units used for the non-target object. Although this is four units in the first embodiment, no particular limitation is made on the number of imaging units as long as it is a smaller number than the number of imaging units used for the target object.

Second Embodiment

In the first embodiment, a foreground object designated by the user is set as a target object by the object setting unit 108, and the combination of imaging units to be used is switched. In a second embodiment, a foreground object present in an area designated as an imaging space is set as the target object, and the combination of imaging units to be used is switched. The configuration of the image processing system and the overall processing according to the second embodiment is the same as in the first embodiment (FIGS. 1, 2, and 3B). The configurations of and processing by the object setting unit 108 and the selection unit 109 according to the second embodiment are different from the first embodiment, and thus mainly these will be described hereinafter.

Figure 8:
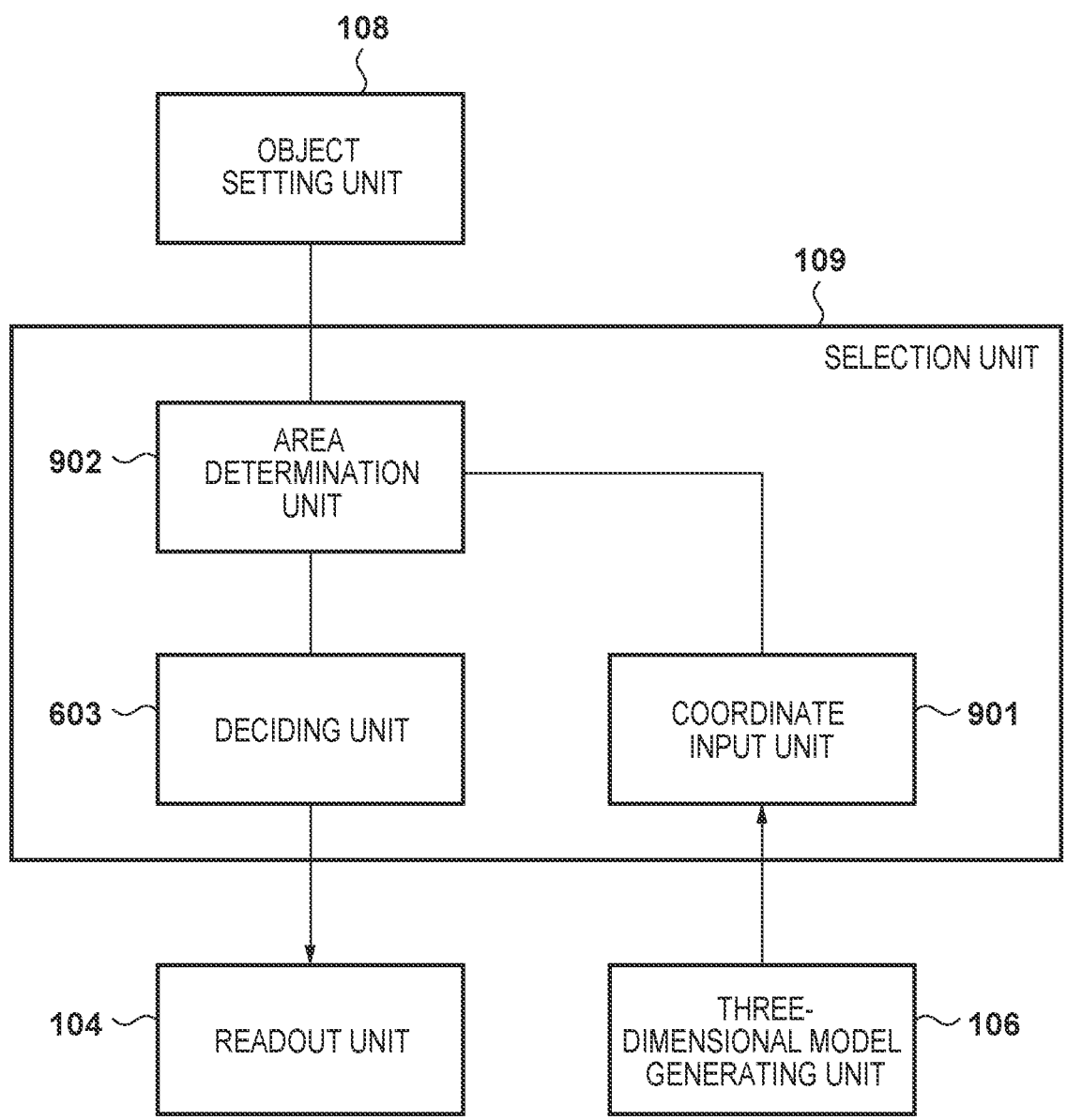
FIG. 8 is a block diagram illustrating an example of the functional configuration of the selection unit.
Figure 9:
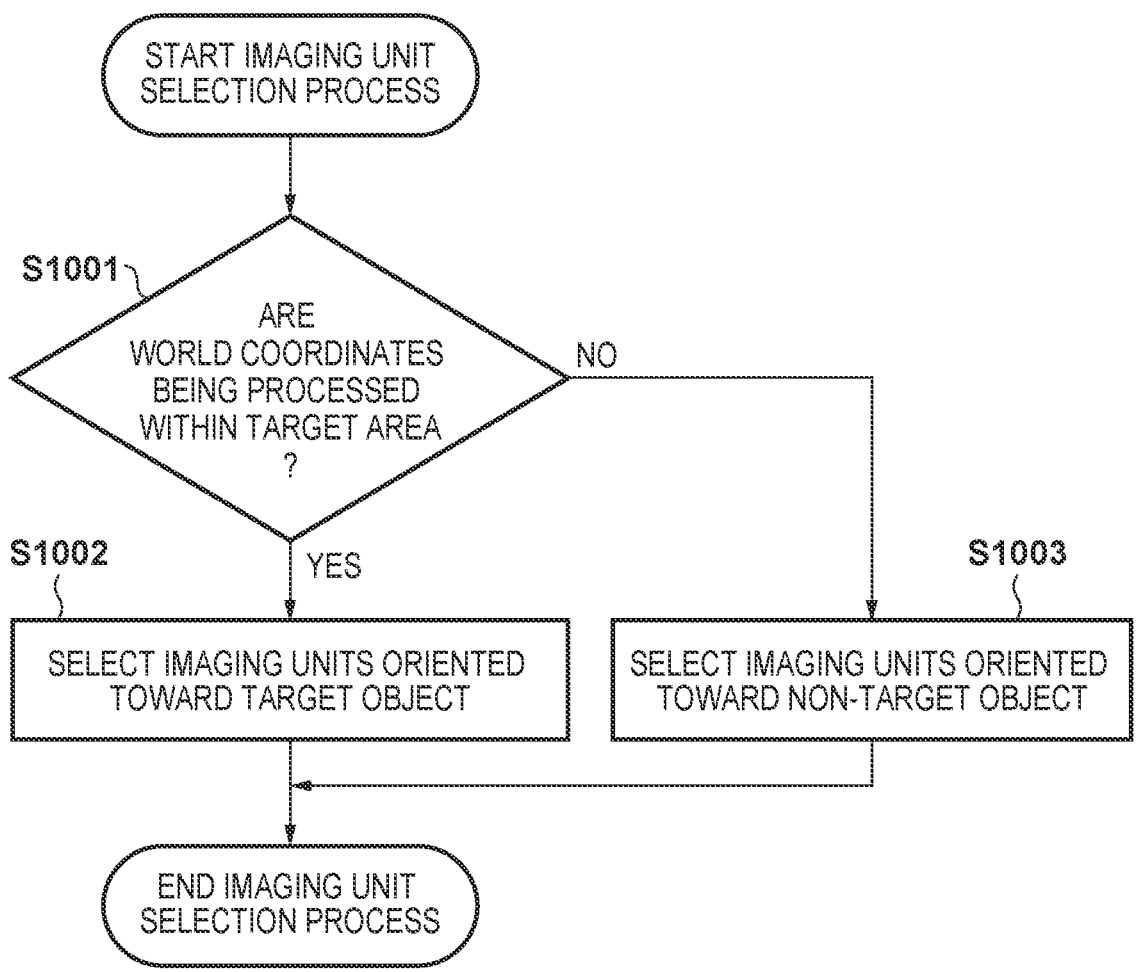
FIG. 9 is a flowchart illustrating a selection process of an imaging unit.

FIG. 8 is a block diagram illustrating an example of the functional configuration of the selection unit 109 according to the second embodiment. FIG. 9 is a flowchart illustrating the processing by the selection unit 109 according to the second embodiment. FIG. 10 is a diagram illustrating the setting of a target area according to the second embodiment.

The target area is set in the imaging space by the object setting unit 108. In the second embodiment, the user designates the target area through an operation screen 1101 such as that illustrated in FIG. 10. Specifically, the operation screen 1101 includes a display screen 1102 in which the designated area is displayed in three dimensions, and an area designation screen 1103, which is a bird's-eye view screen of the overall area for designating the area. The user manipulates an area designation pointer 1105 in the area designation screen 1103 using a mouse, which is an operating device, and sets a target area 1104. Upon two points being designated using the mouse, a rectangular area taking the designated two points as corners is set as the target area 1104. A preset fixed value is used for the designation in the height direction, such that a three-dimensional target area 1106 is set and displayed in the display screen 1102. Note that no limitation is placed on the means for designating the shape of the area. Aside from a rectangle expressed using two designated points, the area designated in the area designation screen 1103 may be any desired quadrangle obtained by designating all four points; the area may be designated as a circle, or designated as a freely-drawn curve as well. Additionally, no limitation is placed on the designating device, and a touchpad, a directional key, or the like may be used instead of a mouse. Finally, although a fixed value is used for the height direction, the value may instead be specifiable by the user.

The selection unit 109 according to the second embodiment will be described in detail next. The coordinates of the object currently being processed (the object coordinates) are received from the three-dimensional model generating unit 106 by a coordinate input unit 901, and are then sent to an area determination unit 902. The area determination unit 902 compares information of the target area sent from the object setting unit 108 with the object coordinates from the coordinate input unit 901, and sends the determination result to the deciding unit 603. The "information of the target area" is information of coordinates expressing the range of the three-dimensional target area 1106 set as indicated in FIG. 10. For example, the information of the target area indicates a range corresponding to the target area with respect to x, y, and z three-dimensional coordinates. No particular limitation is placed on the format in which the information of the target area is held. For example, in its simplest state, all of the coordinates in the target area may be held as a list. Alternatively, the target area may be expressed through some sort of mathematical formula. If a simple rectangle is designated, the set area can be expressed by defining a range for each of the x, y, and z coordinate values. The deciding unit 603 decides on the imaging units to provide foregrounds read out on the basis of the result of the above-described comparison, and sends a readout instruction to the readout unit 104.

Figure 11A:
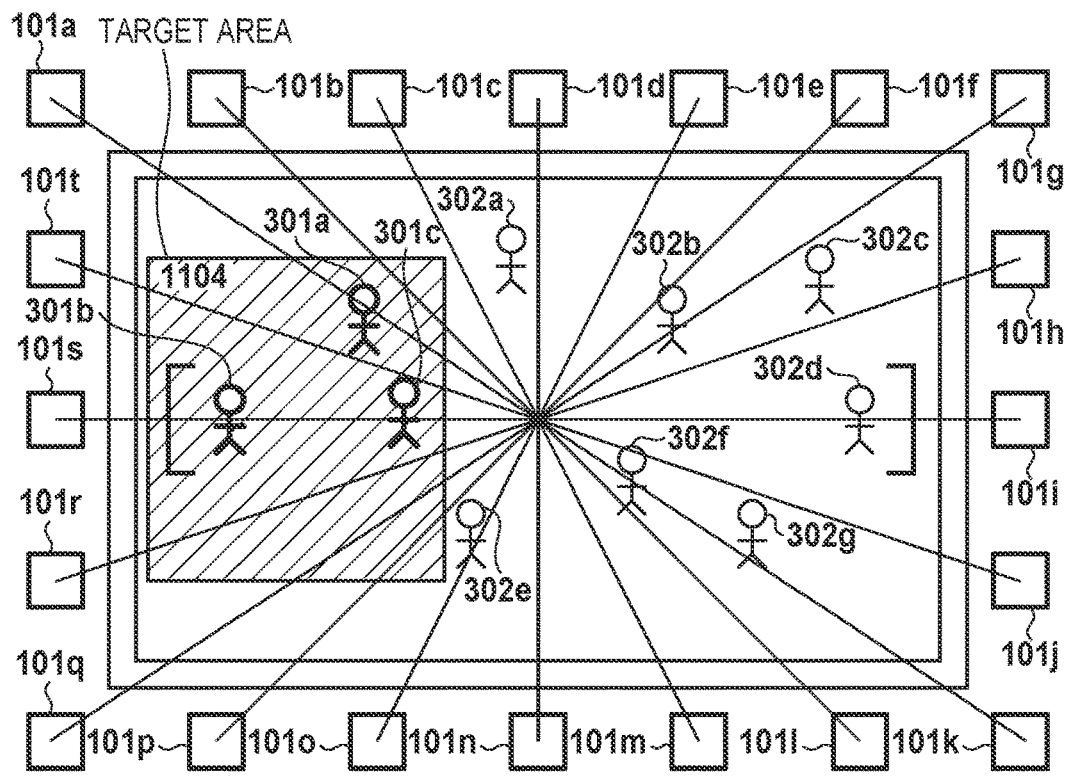
FIG. 11A is a diagram illustrating an example of relationships between objects inside a target area and imaging units being used.
Figure 11B:
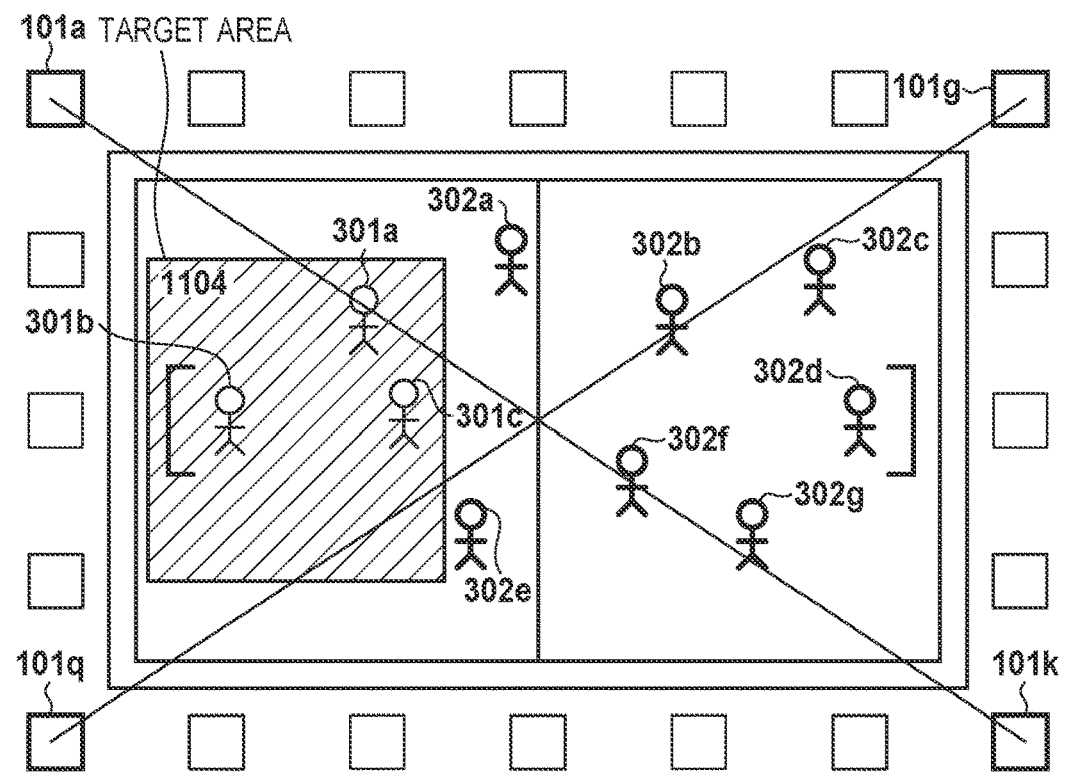
FIG. 11B is a diagram illustrating an example of relationships between objects outside a target area and imaging units being used.

The process of selecting the imaging units carried out by the selection unit 109 according to the second embodiment will be described next with reference to the flowchart in FIG. 9. First, the area determination unit 902 determines whether or not the world coordinates being processed (the object coordinates obtained by the coordinate input unit 901) are inside the target area set by the object setting unit 108 (S1001). If the world coordinates being processed are inside the target area (YES in S1001), the deciding unit 603 selects the imaging units 101 oriented toward the target object as the imaging units providing the foregrounds to be used (S1002). However, if the world coordinates being processed are not inside the target area (NO in S1001), the deciding unit 603 selects the imaging units 101 oriented toward the non-target object as the imaging units providing the foregrounds to be used (S1003). For example, the objects 301*a*, 301*b*, and 301*c*, which have been determined to be inside the target area, are determined to be target objects, as illustrated in FIG. 11A. All of the imaging units 101*a-t* are selected as the imaging units providing the foregrounds to be used to generate the three-dimensional models of these objects. Meanwhile, the objects 302*a-g* present outside the target area 1104 are determined to be non-target objects, as illustrated in FIG. 11B. The imaging units 101*a*, 101*g*, 101*k*, and 101*q* are selected as the imaging units providing the foregrounds to be used to generate the three-dimensional models of these objects.

As described above, according to the second embodiment, it is possible to handle a situation in which objects present in a specific area designated by a user, such as the area in front of a soccer goal, are targeted, rather than targeting individual objects. Designating objects within an area as target objects also makes it possible to handle a situation such as where the level of importance of players leaving the area in front of the goal is reduced and the level of importance of players entering the area in front of the goal is increased.

Note that a variety of standards are conceivable as standards for determining whether or not the object is inside the target area. For example:
when the entire object is inside the target area, that object is determined to be inside the target area,
when the object is at least partially inside the target area, that object is determined to be inside the target area, or
when the center (center of gravity) of the object is inside the target area, that object is determined to be inside the target area.

By treating an object as a target object when even a part of the object is inside the target area, a drop in the image quality caused by only part of the object having a high resolution can be prevented.

Third Embodiment

In the second embodiment, the target area that is set is fixed. A third embodiment will describe a configuration in which the target area is moved and/or transformed in response to target object movement. The third embodiment changes the processing by the object setting unit 108 from that described in the second embodiment, and thus the following will primarily describe configurations that are different from the second embodiment.

Figure 12A:
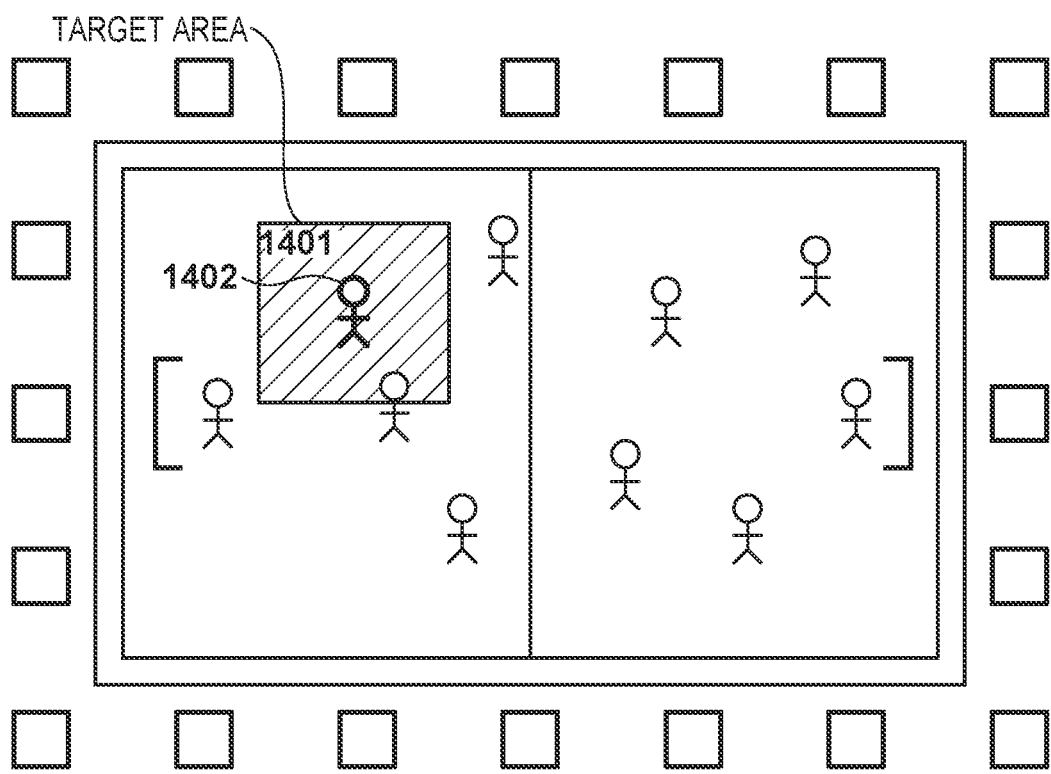
FIGS. 12A and 12B are diagrams illustrating an example of a relationship between a target area and a target object.
Figure 12B:
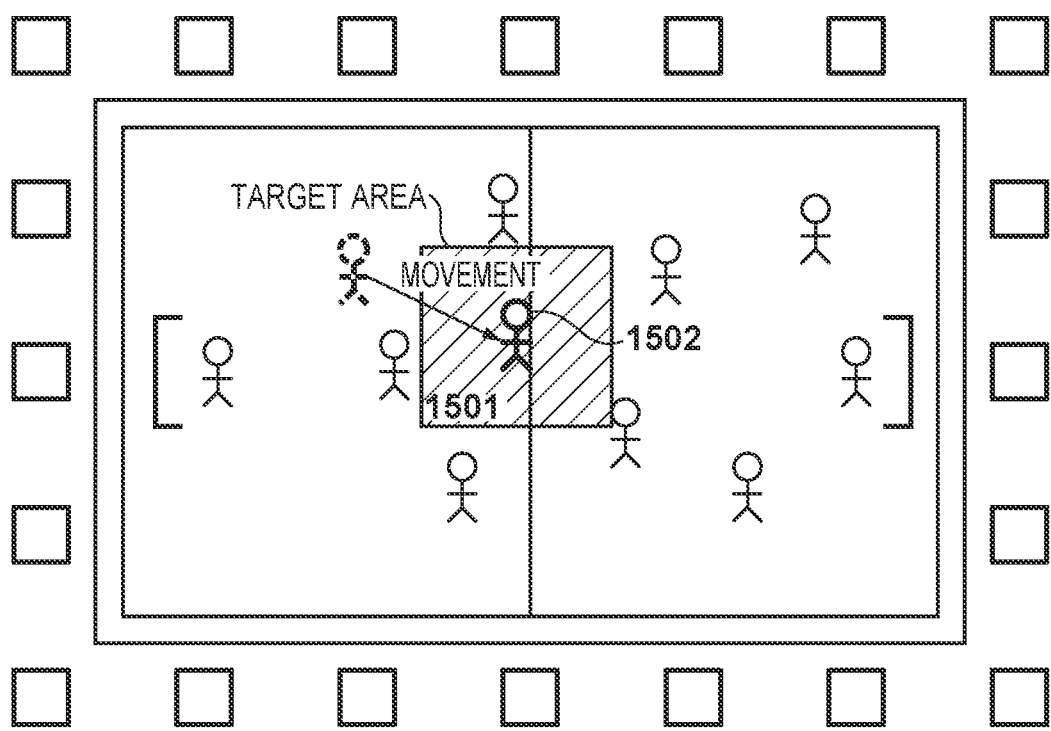

First, a configuration in which the position of a designated target area is changed (moved) by following movement of an object inside the target area will be described. FIGS. 12A and 12B are diagrams illustrating a method for setting the target area according to the third embodiment. In FIG. 12A, it is assumed that the user has set a target area 1401. The method of setting the target area is the same as in the second embodiment. An object 1402 is present in the target area 1401. FIG. 12B illustrates a state after the passage of a set amount of time from the state illustrated in FIG. 12A, and in FIG. 12B, the object 1402 has moved to the position of an object 1502. As a result, the target area 1401 is also reset as a target area 1501, having followed the movement of the object 1402.

Figure 13A:
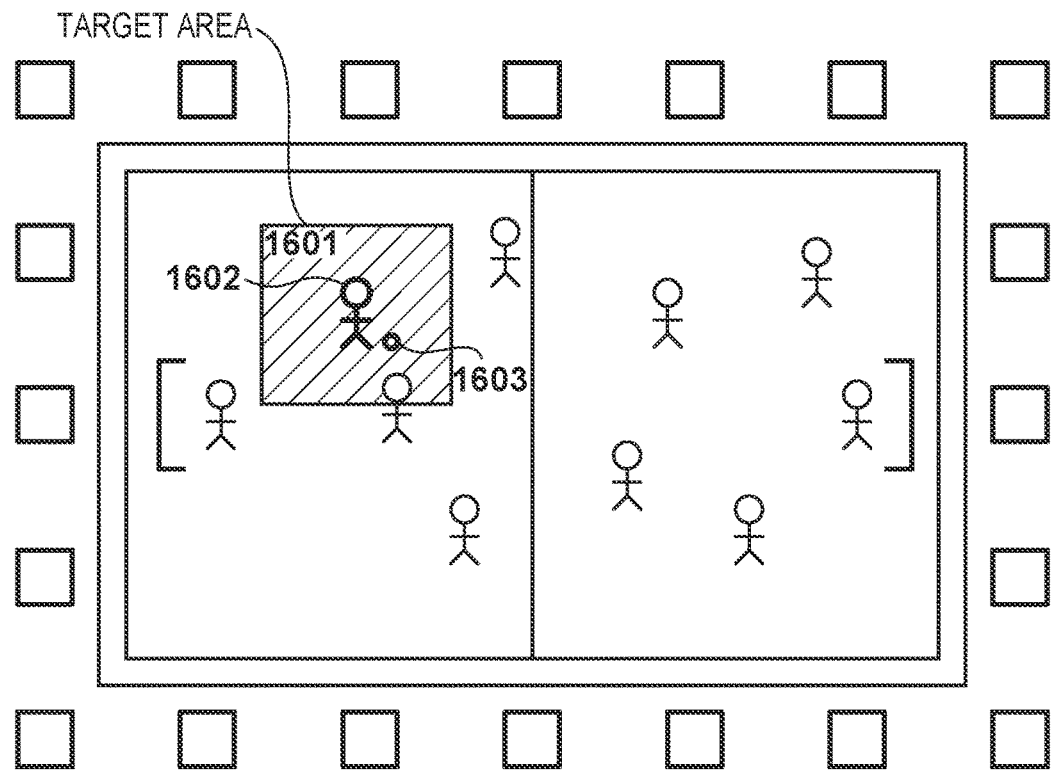
FIGS. 13A and 13B are diagrams illustrating an example of a relationship between a target area and a target object.
Figure 13B:
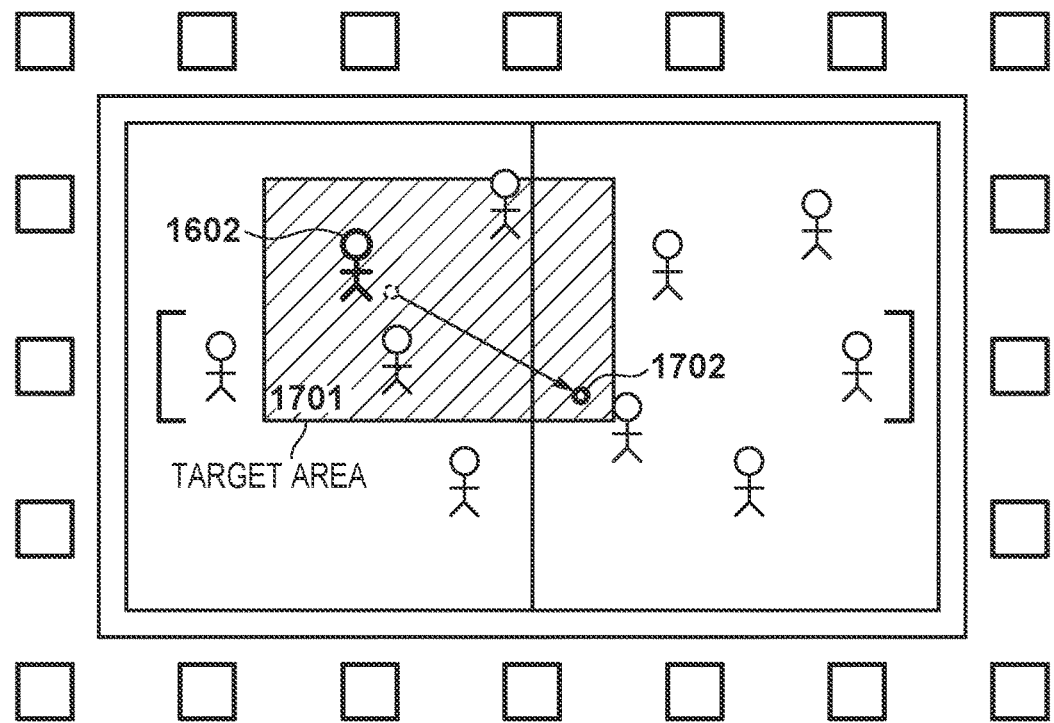

FIGS. 13A and 13B are diagrams illustrating another example of a method for setting the target area according to the third embodiment. In FIGS. 13A and 13B, the size or shape of a designated target area is changed by following the movement of the object inside the target area. In FIG. 13A, it is assumed that the user has set a target area 1601. An object 1602, which is a person, and an object 1603, which is a ball, are present in the target area 1601. FIG. 13B illustrates a state after the passage of a set amount of time from the state illustrated in FIG. 13A, and although the object 1602 is not moving, the object 1603 has moved to the position of an object 1702. Although the target area 1601 cannot cover the areas of the object 1602 and the object 1702 as-is, the target area is reset to a target area 1701 that contains those objects.

Figure 14:
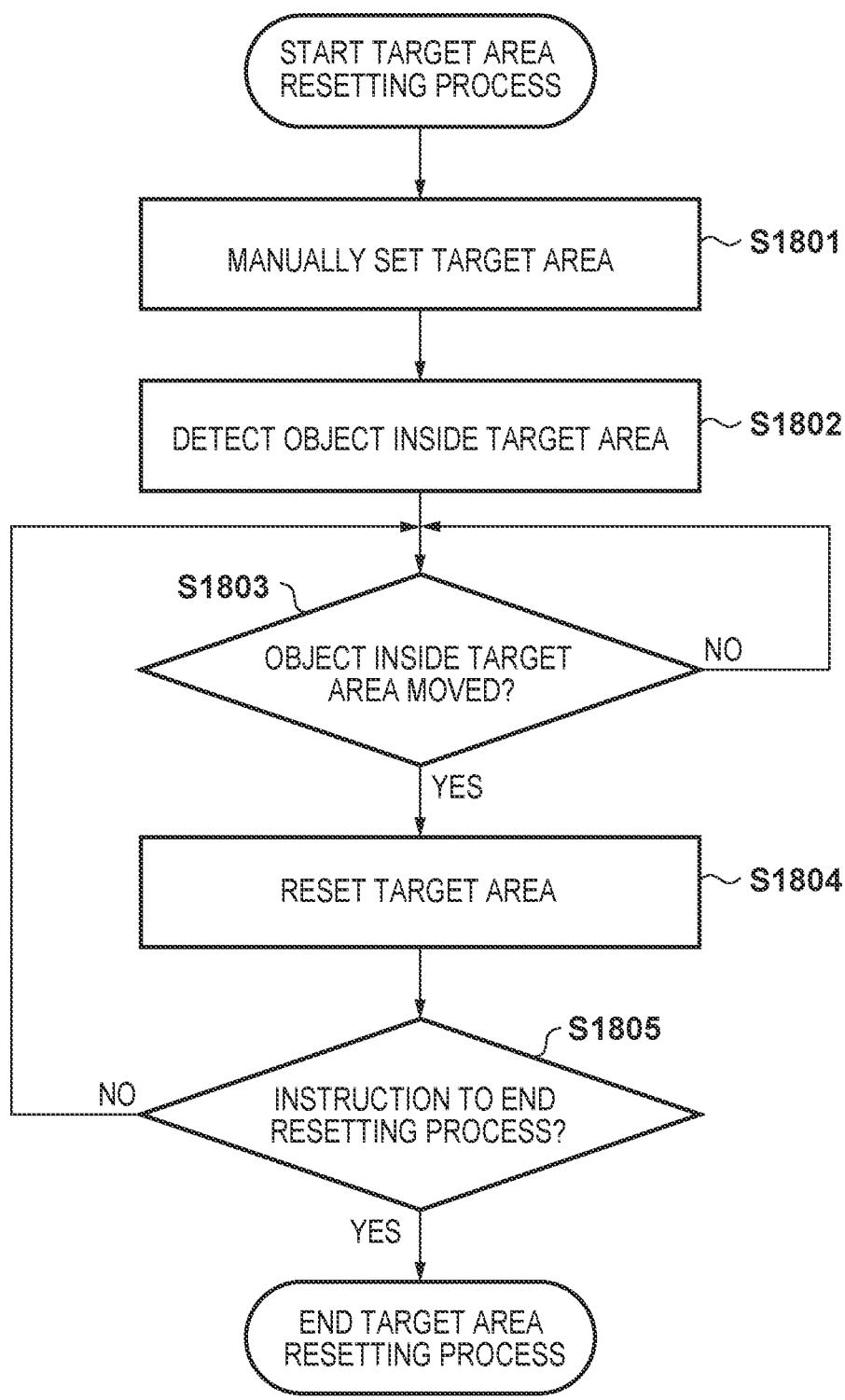
FIG. 14 is a flowchart illustrating a resetting process for a target area.

A process of resetting the target area in the above-described two cases will be described next with reference to the flowchart in FIG. 14. First, the object setting unit 108 sets the target area in the imaging space in accordance with a manual user operation (S1801). Once the target area has been set, the object setting unit 108 detects the objects within the target area (S1802). Although no particular limitation is placed on the means for detecting the object, it is necessary for the object to be distinguished from other objects in order to track the movement of the object. Thus the object is recognized and distinguished by extracting a feature amount. Scale-Invariant Feature Transform (SIFT), Speeded Up Robust Features (SURF), and so on can be given as examples of such an algorithm for extracting a feature amount.

The number of objects, as well as feature amounts and position information identifying the individual objects, are obtained from the feature amount extraction. Objects have sizes, and thus it is assumed that the position information of the objects is held such that the coordinates of the object centers are held as well. Note that the position information of the objects may be managed through coordinate ranges, such as bounding boxes, which are the external contours of polygon areas of the objects, spheres extending a set range from the centers of coordinates, or the like.

The object setting unit 108 determines whether or not the object has moved inside of the target area each time a set amount of time determined in advance by the user has passed (S1803). For example, the object setting unit 108 detects the object each time, and obtains a movement amount by comparing the obtained object position information with the position information obtained the previous time. The object setting unit 108 determines that the object has moved if the obtained movement amount exceeds a predetermined threshold.

If it is determined that the object has moved (YES in S1803), the target area is reset so as to contain the position to which the object inside the target area before the movement has moved (S1804). For example, as illustrated in FIGS. 12A and 12B, when following a single object present in the target area, the target area moves so as to maintain the position of the target area relative to the position (e.g., the center of gravity) of the object. The size of the target area is not changed in this case. When following a plurality of objects present in the target area as illustrated in FIGS. 13A and 13B, the target area is transformed so as to both contain the target area originally set and contain the plurality of objects being followed.

When determining whether an object inside the target area has moved (S1803), an object that has newly entered the target area is ignored. In other words, the object detected in S1802 when the target area is set in S1801 is taken as the target object whose movement is to be followed, and objects that have newly entered the target area in the loop from S1803 and on are not subject to following. This is because there is no reference for the object before it moved. Additionally, an object newly present within the target area as a result of the target area being reset (S1804) is not used as a target object for determining movement in S1803, i.e., as an object whose movement is to be followed. In generating the three-dimensional models, however, objects present in the target area are treated as target objects for both the pre-movement target area and the post-movement target area. Thus movement is detected (S1803) and the target area is reset (S1804) in accordance with the movement of the object over time. The process of resetting the target area ends upon the user making an instruction to end the resetting process (S1805).

Note that the user may be enabled to select whether to move/transform a target area that has been set so as to follow an object inside the target area, as described in the third embodiment, or fix the target area, as described in the second embodiment. The user may also be enabled to change the target area manually through the object setting unit 108, partway through a game or the like.

According to the third embodiment as described thus far, even if an object present in a target area that has been designated moves, the object inside the target area can be automatically followed without the user having to reset the target area.

Fourth Embodiment

In the first to third embodiments, the combination of imaging units (foregrounds) being used is changed in accordance with whether or not the subject of the three-dimensional model generation process is a target object. In a fourth embodiment, the combination of imaging units selected from the plurality of imaging units is changed on the basis of a distance between a target object inside the target area and a predetermined position inside the target area. The configuration according to the fourth embodiment is the same as the configuration according to the first embodiment illustrated in FIG. 1. Some of the processing by the selection unit 109 is different, however, and will be described with reference to FIGS. 15A, 15B, and 16. However, the configuration of the selection unit 109 is the same as in the second embodiment (FIG. 8). The following will describe an example in which the center of the target area is used as the predetermined position inside the target area.

Figure 15A:
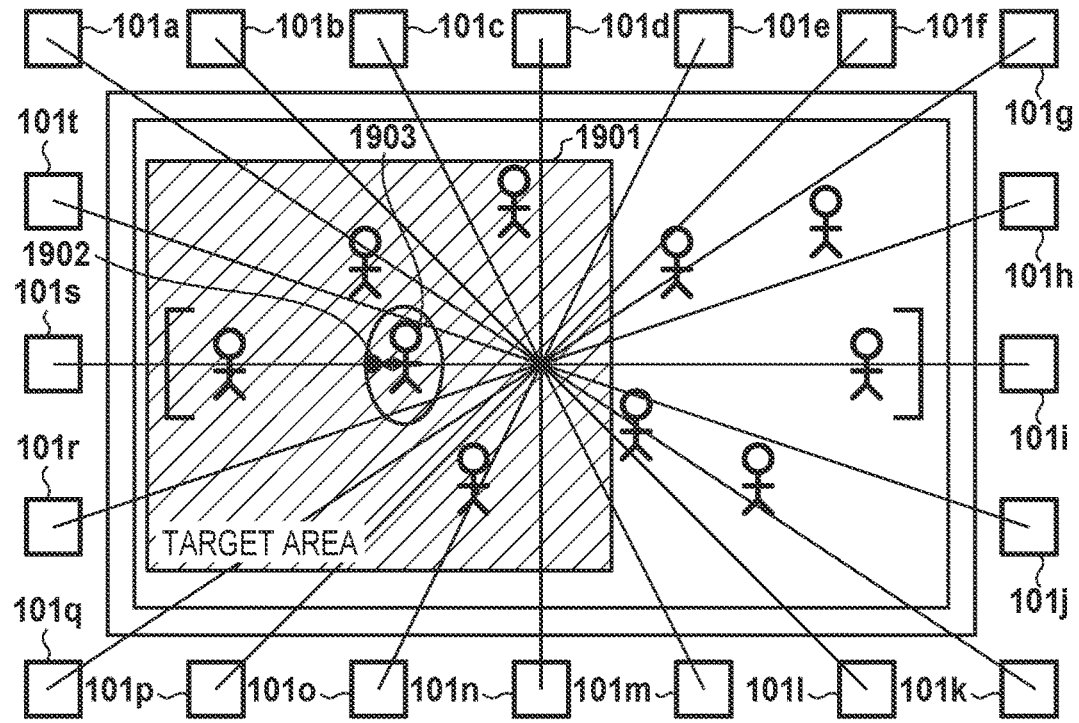
FIGS. 15A and 15B are diagrams illustrating an example of a relationship between a target area and a target object.
Figure 15B:
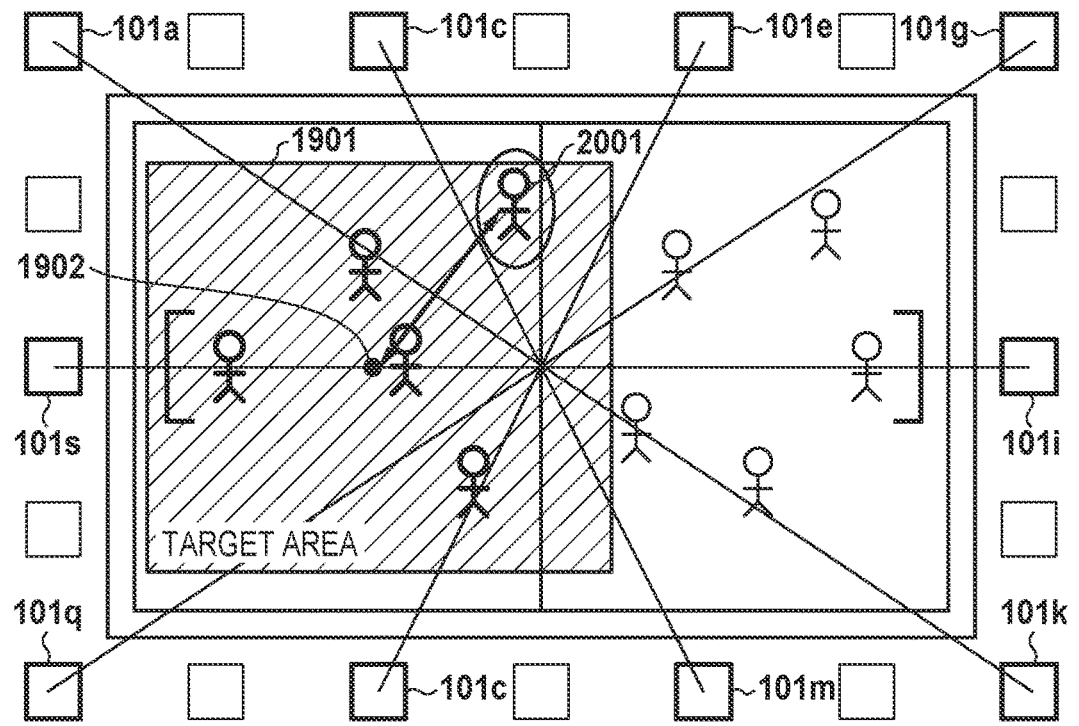

In FIG. 15A, the target area is set as indicated by 1901. Objects present inside the target area 1901 are set as target objects. Here, an object 1903 is located near a center 1902 of the target area 1901, and a three-dimensional model of the object 1903 is generated using the foregrounds from all of the imaging units 101a-t. An object 2001 is inside the target area 1901 as well, as indicated in FIG. 15B. Here, the object 2001 is present at a position distanced from the center 1902 of the target area, and thus a three-dimensional model of the object 2001 is generated using the foregrounds from ten of the imaging units 101, namely the imaging units 101a, c, e, g, i, k, m, o, q, and s.

Figure 16:
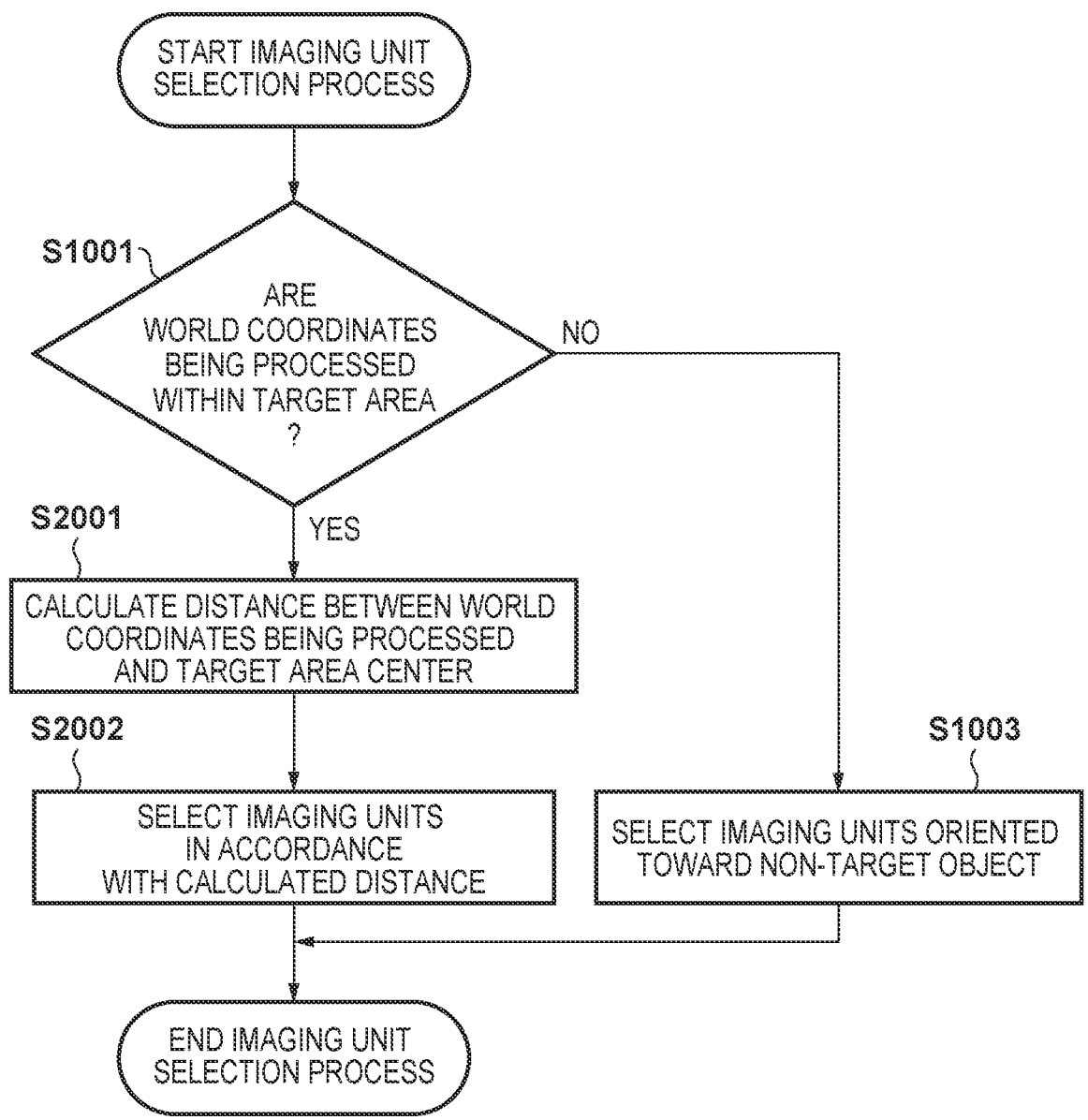
FIG. 16 is a flowchart illustrating a selection process of an imaging unit.

Processing by the selection unit 109 will be described next with reference to the flowchart in FIG. 16.

If the area determination unit 902 of the selection unit 109 has determined that the target object being processed is inside the target area (YES in S1001), the distance between that target object and the center of the target area is calculated (S2001). The center of the object is used as the position of the object used when calculating the distance. Because an object has a given size as described earlier, there are various ways of expressing the position of the object, and the position is thus not limited to the center.

The deciding unit 603 selects the imaging units providing the foregrounds used to generate the three-dimensional model in accordance with the distance between the center of the target area and the object being processed calculated in S2001 (S2002). The deciding unit 603 reduces the number of imaging units selected as the distance between the predetermined position inside the target area and the object being processed (the distance calculated in S2001) increases. This embodiment assumes that relationships between the distance and which imaging units are to be selected are held in advance as a table. If the calculated distance is represented by x and a threshold by a, the table is as follows, for example.

x<α: all of the imaging units 101 are used
x≥α: the imaging units 101*a, c, e, g, i, k, m, o, q*, and *s* are used If the object being processed is not inside the target area (NO in S1001), the deciding unit 603 selects the imaging units 101 oriented toward a non-target object as the imaging units providing the foregrounds to be used (S1003). This process is the same as in the second embodiment (S1001 and S1003 in FIG. 9). Although the distance between the center of the target area and the object is used in this embodiment, the configuration is not limited thereto. For example, the distance between an arbitrary point set by the user inside the target area and an object may be used, or the distance between the center of a given predetermined object (e.g., a goal or a ball) and the object being processed may be used.

Furthermore, although every other imaging unit 101 in the overall layout is selected in FIG. 15B, the selection method is not limited to this method. For example, every third imaging unit 101 in the overall layout may be selected instead. When a plurality of imaging units are laid out at equal intervals around an imaging space, the drop in the accuracy of the three-dimensional model will no longer depend on the field of view if the imaging units at set intervals are selected. Additionally, in this embodiment, the target area is offset toward the left half of the field. Thus priority may be given to the imaging units closer to the target area, such that the imaging units 101*a-d* and 101*n-t* in FIG. 15A are used. However, the angles of view covered by the respective imaging units 101 are important when generating the three-dimensional model. If there is a range that cannot be clearly imaged, i.e., that cannot be seen, it is in principle impossible to correctly generate a three-dimensional model for that range. It is thus assumed that the accuracy of the generated model, and furthermore the orientations for which accuracy is considered important, are selected and decided on by the user, and set as the above-described table in advance.

According to the fourth embodiment as described thus far, the overall computation amount can be further reduced by setting a priority level for the accuracy of the three-dimensional model in stages, even for objects present in the target area. The method for setting the priority level of an object is not limited to the position of the object inside the target area, and a variety of methods can be employed. For example, the user may set a priority level for each object in advance, or the user may designate areas of high, medium, and low priority levels. Alternatively, specific objects within the same area, such as the players on a specific team, may be assigned a higher priority level. Furthermore, if the subject of the imaging is a ball game, the priority level of an object may be set automatically in accordance with the distance of the object from the ball. In this manner, a variety of methods can be used to set the priority level of the object.

Fifth Embodiment

Figure 17:
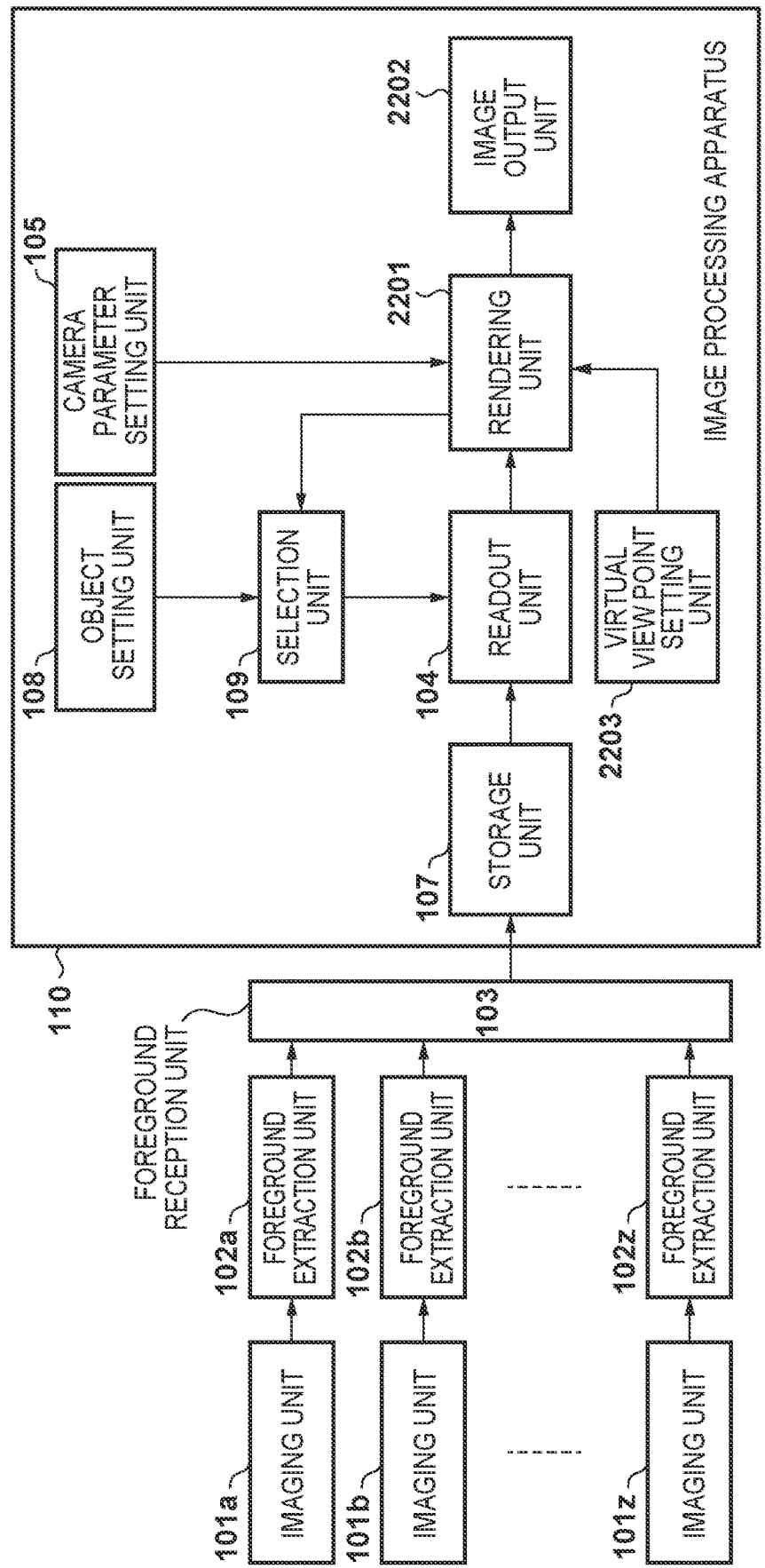
FIG. 17 is a block diagram illustrating an example of the functional configuration of an image processing apparatus.

The first to fourth embodiments describe examples of processes for generating a three-dimensional model to be processed, as image processing using a plurality of images (foregrounds). A fifth embodiment will describe a case where a process of rendering an image from an arbitrary viewpoint to be processed is employed as the image processing. FIG. 17 illustrates the configuration of an image processing apparatus according to the fifth embodiment. Aside from a rendering unit 2201 and an image output unit 2202, the configuration is the same as in the first embodiment. Additionally, the storage unit 107 is connected to the foreground reception unit 103 directly, and all of the images from all of the imaging units 101 are stored in the storage unit 107. The storage unit 107 is the target to which the readout unit 104 reads out the foregrounds in accordance with instructions from the selection unit 109.

The rendering unit 2201 carries out processing different from the three-dimensional model generation process of the first and other embodiments. Namely, the rendering unit 2201 adds color to the generated three-dimensional model, and outputs a state of projection onto two-dimensional coordinates from a user's desired viewpoint as a rendering result. Information pertaining to the user's desired viewpoint is input as a virtual viewpoint, which is a viewpoint from a virtual imaging unit, and is input in the same format as the camera parameters. It is assumed that the three-dimensional model of the foreground object is stored in the storage unit 107, read out by the readout unit 104, and provided to the rendering unit 2201. The configuration for generating the three-dimensional model may be provided in the foreground reception unit 103, in the image processing apparatus 110, or in a device different from those units. The three-dimensional model may be generated through the methods described in the first to fourth embodiments.

The output rendering result is sent to the image output unit 2202, and the image output unit 2202 converts the rendering result to an image format and outputs the resulting image. The output image format is assumed here to be DVI, but is not limited thereto. SDI, streaming a moving image file over a network, and so on can be given as examples of formats aside from DVI.

The rendering unit 2201 receives the user's desired viewpoint from a virtual viewpoint setting unit 2203, and determines objects within the field of view from the virtual viewpoint. Like the first embodiment, the object IDs of these objects are the information passed to the selection unit 109 from the rendering unit 2201.

The processing by the object setting unit 108 and the selection unit 109 is similar to that in the first embodiment. Namely, the imaging units (foregrounds) used in the rendering process are selected. The number of imaging units (foregrounds) is a parameter affecting the processing load in the rendering process as well. For example, in some rendering processes, if a color seen from a given viewpoint is to be added, the colors seen from the respective imaging units 101 are referenced, and a mixing process is carried out while weighting the colors of the imaging units 101 close to the rendering target. Thus a process for referencing the foreground data from a plurality of imaging units also exists in the rendering process. As such, a configuration such as that illustrated in FIG. 17 makes it possible to reduce the overall computation amount while maintaining accuracy only for the rendering target, which serves as the target object.

The methods for selecting the imaging units described in the second, third, and fourth embodiments can also be applied in the configuration illustrated in FIG. 17, and thus the same effects as in the second, third, and fourth embodiments can be achieved in the rendering process as well. Although the foregoing describes an example of application in rendering using a three-dimensional model (known as "model-based rendering"), the application is not limited thereto. For example, the invention can also be applied in image-based rendering, which does not use a three-dimensional model.

According to the above-described first to fourth embodiments, the accuracy of three-dimensional models generated for objects aside from a specific object is made lower than the accuracy of a three-dimensional model generate for the specific object. According to the fifth embodiment, the number of imaging units used to render objects aside from a specific object is made lower than the number of imaging units used to render the specific object. Accordingly, the overall computation amount can be reduced while suppressing a drop in the accuracy of processing the specific object. The foregoing embodiments describe a method in which the user designates target objects individually, a method in which the user designates a target area, and so on as examples of the method for setting the target object. The method is not limited to those examples, however. For example, when capturing a ball game, players closer to the ball may be automatically recognized as target objects, or players having a high amount of movement per unit of time may be automatically recognized as target objects. Furthermore, objects present in an area where people are crowded together may be automatically recognized as target objects. The user may also be enabled to select one of the plurality of methods as desired.

According to the foregoing embodiments, in image processing using images from a plurality of imaging units, the overall computation amount can be reduced while suppressing a drop in the accuracy of processing a specific object among a plurality of objects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-133057, filed Jul. 6, 2017, which is hereby incorporated by reference herein in its entirety.

What is claimed is:

1. An image processing apparatus comprising:
one or more memories storing instructions; and
one or more processors executing the instructions to:
set a target object inside an imaging space captured by a plurality of imaging devices;
select, from among the plurality of imaging devices, one or more imaging devices for a first object that is set as the target object;
select, from among the plurality of imaging devices, one or more imaging devices for a second object that is not set as the target object;
determine whether a candidate of a three-dimensional model of the first object corresponds to an object included in each of one or more images captured by the selected one or more imaging devices for the first object;
determine whether a candidate of a three-dimensional model of the second object corresponds to an object included in each of one or more images captured by the selected one or more imaging devices for the second object, wherein a number of the selected one or more imaging devices for the first object is larger than a number of the selected one or more imaging devices for the second object; and
generate three-dimensional models of the first and second objects based on the determination.

2. The image processing apparatus according to claim 1, wherein the one or more processors further execute the instructions to:
manage, on the basis of identifiers, objects existing inside the imaging space; and
receive a designation of an identifier from a user,
wherein an object which corresponds to an identifier among the plurality of managed identifiers and corresponds to the received designation is set as the target object.

3. The image processing apparatus according to claim 1, wherein the one or more processors further execute the instructions to receive, from a user, a designation of an object in the imaging space, and
wherein an object corresponding to the received designation is set as the target object.

4. The image processing apparatus according to claim 1, wherein the one or more processors further execute the instructions to receive, from a user, a designation of an area in the imaging space,
wherein an object existing in an area corresponding to the received designation is set as the target object.

5. The image processing apparatus according to claim 1, wherein an object existing inside a target area set inside the imaging space is set as the target object.

6. The image processing apparatus according to claim 5, wherein the one or more processors further execute the instructions to
change at least one of a position, a size, and a shape of the target area so as to follow movement of an object inside the target area.

7. The image processing apparatus according to claim 5, wherein a combination of the imaging devices providing the images used in the determination for the target object is set from the plurality of imaging devices on the basis of a distance between the target object inside the target area and a predetermined position inside the target area.

8. The image processing apparatus according to claim 7, wherein the number of imaging devices that is set is reduced as the distance increases.

9. The image processing apparatus according to claim 8, wherein the predetermined position is inside a center of the target area.

10. The image processing apparatus according to claim 5, wherein the one or more processors further execute the instructions to select an imaging device, among the plurality of imaging devices, that is closer to the target area with priority.

11. The image processing apparatus according to claim 1, wherein the one or more processors further execute the instructions to
convert three dimensional coordinates of elements forming the three-dimensional model to two dimensional coordinates on each of the images obtained based on image capturing by the plurality of imaging devices and,
determine whether the two dimensional coordinates as coordinates corresponding to the elements are included in the object included in each of the one or more images captured by the selected one or more imaging devices.

12. An image processing method comprising:
setting a target object inside an imaging space;
selecting, from among a plurality of imaging devices, one or more imaging devices for a first object that is set as the target object;
selecting, from among the plurality of imaging devices, one or more imaging devices for a second object that is not set as the target object;
determining whether a candidate of a three-dimensional model of the first object corresponds to an object included in each of one or more images captured by the selected one or more imaging devices for the first object;
determining whether a candidate of a three-dimensional model of the second object corresponds to an object included in each of one or more images captured by the selected one or more imaging devices for the second object, wherein a number of the selected one or more imaging devices for the first object is larger than a number of the selected one or more imaging devices for the second object; and
generating three-dimensional models of the first and second objects based on the determination.

13. A non-transitory computer-readable storage medium storing a program for causing a computer to execute an image processing method comprising:
setting a target object inside an imaging space;
selecting, from among a plurality of imaging devices, one or more imaging devices for a first object that is set as the target object;
selecting, from among the plurality of imaging devices, one or more imaging devices for a second object that is not set as the target object;
determining whether a candidate of a three-dimensional model of the first object corresponds to an object included in each of one or more images captured by the selected one or more imaging devices for the first object;
determining whether a candidate of a three-dimensional model of the second object corresponds to an object included in each of one or more images captured by the selected one or more imaging devices for the second object, wherein a number of the selected one or more imaging devices for the first object is larger than a number of the selected one or more imaging devices for the second object; and
generating three-dimensional models of the first and second objects based on the determination.

\* \* \* \* \*